United States Patent
Thomas et al.

(10) Patent No.: US 9,056,622 B2
(45) Date of Patent: Jun. 16, 2015

(54) MANEUVERABLE STROLLERS

(75) Inventors: Wes Thomas, Kenosha, WI (US); Liviu Iftinca, Chicago, IL (US); Ted Bretschger, Chicago, IL (US); Peter Rolicki, Wheeling, IL (US)

(73) Assignee: KOLCRAFT ENTERPRISES, INC., Chicago, IL (US)

( * ) Notice: Subject to any disclaimer, the term of this patent is extended or adjusted under 35 U.S.C. 154(b) by 0 days.

(21) Appl. No.: 13/817,401

(22) PCT Filed: Nov. 30, 2011

(86) PCT No.: PCT/US2011/062669
§ 371 (c)(1),
(2), (4) Date: Feb. 15, 2013

(87) PCT Pub. No.: WO2012/075157
PCT Pub. Date: Jun. 7, 2012

(65) Prior Publication Data
US 2013/0154215 A1    Jun. 20, 2013

Related U.S. Application Data

(60) Provisional application No. 61/418,161, filed on Nov. 30, 2010.

(51) Int. Cl.
*B62B 7/06* (2006.01)
*A61G 5/06* (2006.01)
(Continued)

(52) U.S. Cl.
CPC ............... *B62B 7/04* (2013.01); *B62B 2301/08* (2013.01); *B62B 7/06* (2013.01);
(Continued)

(58) Field of Classification Search
CPC .......... B62B 3/1492; B62B 7/04; B62B 7/06; B62B 9/18; B62B 2301/00; B62B 2301/044; B62B 2301/08; A61G 5/06; A61G 2005/1054; A61G 2005/1078; A61G 2005/1089
USPC ........ 280/47.16, 47.38, 47.41, 642, 643, 647, 280/650, 657, 658
See application file for complete search history.

(56) References Cited

U.S. PATENT DOCUMENTS 1,239,498 A    9/1917 Madigan
1,322,788 A    11/1919 Hazelton
(Continued)

FOREIGN PATENT DOCUMENTS

CN    2776791    5/2006
CN    101284543    10/2008
(Continued)

OTHER PUBLICATIONS

Patent Cooperation Treaty, International Search Report, issued in connection with International Application No. PCT/US2011/062669, mailed on Jun. 29, 2012 (3 pages).
(Continued)

*Primary Examiner* — Frank Vanaman
(74) *Attorney, Agent, or Firm* — Hanley, Flight & Zimmerman, LLC

(57) ABSTRACT

Maneuverable strollers are disclosed herein. An example stroller includes a frame, front wheels and rear wheels to support the frame, and an intermediate wheel between the front wheels and the rear wheels. The intermediate wheel is to provide a pivot point to turn the stroller. The intermediate wheel has a first diameter, the front and rear wheels have respective second and third diameters, where the first diameter is larger than the second diameter and the first diameter is larger than the third diameter.

15 Claims, 21 Drawing Sheets

(51) Int. Cl.
  *B62B 7/04* (2006.01)
  *B62B 7/00* (2006.01)
  *B62B 7/10* (2006.01)
  *B62B 9/18* (2006.01)
  *A61G 5/10* (2006.01)
  *B62B 3/00* (2006.01)
  *B62B 3/14* (2006.01)

(52) U.S. Cl.
  CPC ......... *A61G 2005/1078* (2013.01); *A61G 5/06* (2013.01); *B62B 3/008* (2013.01); *B62B 3/1492* (2013.01); *B62B 7/008* (2013.01); *B62B 7/042* (2013.01); *B62B 7/10* (2013.01); *B62B 9/18* (2013.01)

(56) References Cited

U.S. PATENT DOCUMENTS

| | | | |
|---|---|---|---|
| 1,418,929 | A | 6/1922 | House |
| 1,832,770 | A | 11/1931 | Hallowell |
| 3,173,396 | A | 3/1965 | Bradov |
| 3,831,960 | A * | 8/1974 | Walton ................ 280/79.11 |
| 4,310,167 | A * | 1/1982 | McLaurin ................ 280/5.28 |
| 4,433,869 | A | 2/1984 | Payne, Jr. et al. |
| 4,893,826 | A | 1/1990 | Ward et al. |
| 4,936,629 | A | 6/1990 | Young |
| 5,022,669 | A * | 6/1991 | Johnson ................ 280/30 |
| D326,748 | S | 6/1992 | Kirk |
| 5,158,319 | A | 10/1992 | Norcia et al. |
| 5,301,968 | A | 4/1994 | Ward et al. |
| 5,417,449 | A | 5/1995 | Shamie |
| 5,556,118 | A | 9/1996 | Kern et al. |
| 5,581,843 | A * | 12/1996 | Purnell ................ 16/35 R |
| 5,653,460 | A | 8/1997 | Fogarty |
| 5,664,795 | A | 9/1997 | Haung |
| 5,722,594 | A | 3/1998 | Farr et al. |
| 6,086,087 | A | 7/2000 | Yang |
| D431,798 | S | 10/2000 | Strycker et al. |
| 6,135,222 | A * | 10/2000 | Furukawa ................ 180/65.51 |
| 6,267,406 | B1 | 7/2001 | Huang |
| 6,312,005 | B1 | 11/2001 | Lin |
| 6,394,470 | B1 | 5/2002 | Shirai |
| 6,454,286 | B1 * | 9/2002 | Hosino ................ 280/250.1 |
| 6,540,239 | B2 * | 4/2003 | Lee, Jr. ................ 280/33.993 |
| 6,698,788 | B2 | 3/2004 | Yang |
| 6,702,306 | B1 | 3/2004 | Ockwell |
| 6,877,762 | B2 * | 4/2005 | Yamazaki ................ 280/647 |
| 6,935,652 | B2 | 8/2005 | Fair et al. |
| 6,938,906 | B1 | 9/2005 | Black |
| 6,981,709 | B2 | 1/2006 | Saint |
| 7,059,625 | B2 | 6/2006 | Horacek |
| 7,261,308 | B2 | 8/2007 | Gwisdalla et al. |
| 7,338,122 | B2 | 3/2008 | Hei et al. |
| 7,481,439 | B2 | 1/2009 | Thompson |
| 7,497,449 | B2 * | 3/2009 | Logger ................ 280/47.38 |
| 7,559,606 | B2 | 7/2009 | Hei et al. |
| 7,597,332 | B2 | 10/2009 | Thompson |
| 7,740,313 | B1 | 6/2010 | Hei et al. |
| 7,770,970 | B2 | 8/2010 | Hei et al. |
| 7,780,184 | B2 | 8/2010 | Ehrenreich et al. |
| 7,789,413 | B2 | 9/2010 | Hei et al. |
| 7,832,756 | B2 | 11/2010 | Storm |
| 7,854,435 | B2 * | 12/2010 | Campbell ................ 280/47.131 |
| 7,887,129 | B2 | 2/2011 | Hei et al. |
| 7,891,732 | B2 | 2/2011 | Hei et al. |
| 7,938,433 | B2 | 5/2011 | Pike et al. |
| 7,971,897 | B2 | 7/2011 | Pike et al. |
| 7,992,889 | B2 | 8/2011 | Ehrenreich et al. |
| 8,029,007 | B2 | 10/2011 | Jones et al. |
| 8,070,179 | B2 | 12/2011 | Pike et al. |
| 8,128,119 | B2 | 3/2012 | Saville et al. |
| 8,157,273 | B2 | 4/2012 | Bar-Lev |
| 8,262,107 | B2 | 9/2012 | Tuckey et al. |
| 8,276,935 | B2 | 10/2012 | Minato et al. |
| 8,882,134 | B2 | 11/2014 | Rolicki et al. |
| 2002/0125662 | A1 | 9/2002 | Magness |
| 2004/0011884 | A1 | 1/2004 | Wilt |
| 2005/0253348 | A1 | 11/2005 | Gwisdalla |
| 2005/0253431 | A1 | 11/2005 | Hei et al. |
| 2005/0264064 | A1 | 12/2005 | Hei et al. |
| 2006/0290107 | A1 | 12/2006 | Powers |
| 2007/0001410 | A1 | 1/2007 | Thompson |
| 2007/0075510 | A1 | 4/2007 | Hei et al. |
| 2007/0114738 | A1 | 5/2007 | Jones et al. |
| 2007/0257526 | A1 | 11/2007 | Hei et al. |
| 2008/0042476 | A1 | 2/2008 | Hei et al. |
| 2008/0224451 | A1 | 9/2008 | Vegt |
| 2009/0072520 | A1 | 3/2009 | Ehrenreich et al. |
| 2009/0302556 | A1 | 12/2009 | White et al. |
| 2009/0302578 | A1 | 12/2009 | White et al. |
| 2010/0032925 | A1 | 2/2010 | Ehrenreich et al. |
| 2010/0072731 | A1 | 3/2010 | Thompson |
| 2010/0109270 | A1 | 5/2010 | Hei et al. |
| 2010/0109293 | A1 | 5/2010 | Friisdahl et al. |
| 2010/0140902 | A1 | 6/2010 | Zehfuss |
| 2010/0148553 | A1 | 6/2010 | Hei et al. |
| 2010/0314925 | A1 | 12/2010 | Hei et al. |
| 2011/0074195 | A1 | 3/2011 | Hei et al. |
| 2011/0101742 | A1 | 5/2011 | Hei et al. |
| 2011/0115264 | A1 | 5/2011 | Hei et al. |
| 2012/0080244 | A1 | 4/2012 | Hou |
| 2014/0191483 | A1 | 7/2014 | Rolicki et al. |
| 2015/0021872 | A1 | 1/2015 | Rolicki et al. |

FOREIGN PATENT DOCUMENTS

| | | |
|---|---|---|
| CN | 103328305 | 9/2013 |
| CN | 103909960 | 7/2014 |
| DE | 202009000172 | 4/2009 |
| EP | 1970283 | 9/2008 |
| GB | 2223717 | 4/1990 |
| JP | 63134365 | 6/1988 |
| JP | 10291480 | 11/1998 |
| JP | 2002087276 | 3/2002 |
| JP | 2006219060 | 8/2006 |
| WO | 2007033562 | 3/2007 |
| WO | 2012075157 | 6/2012 |

OTHER PUBLICATIONS

Patent Cooperation Treaty, Written Opinion of the International Searching Authority, issued in connection with International Application No. PCT/US2011/62669 (8 pages).
Glaro Products, "Glaro Glider Ultimate Bellman Carts," product description, Feb. 22, 2011, 7 pages.
Kegworks, "Six Wheel Warehouse Cart," product description, Feb. 22, 2011, 3 pages.
Global, "Little Giant 6-Wheel Platform Truck 24×48," product description, Feb. 22, 2011, 3 pages.
United States Patent and Trademark Office, "Non-Final Office Action," issued in connection with U.S. Appl. No. 13/828,344, mailed on Dec. 10, 2013, 23 pages.
United States Patent and Trademark Office, "Final Office Action," issued in connection with U.S. Appl. No. 13/828,344, mailed on May 8, 2014, 10 pages.
The International Bureau, "International Preliminary Report on Patentability," issued in connection with International Patent Application No. PCT/US2011/062669, on Jun. 4, 2013, 9 pages.
The United States Patent and Trademark Office, "Notice of Allowance," issued in connection with U.S. Appl. No. 13/828,344, mailed on Jul. 8, 2014, 19 pages.
The United States Patent and Trademark Office, "Office Action," issued in connection with U.S. Appl. No. 14/508,827, mailed on May 7, 2015, 15 pages.
The State Intellectual Property Office of China, "First Notification of Office Action," issued in connection with Chinese Application No. 201180057709.X, on Mar. 27, 2015, with English translation, 20 pages.

* cited by examiner

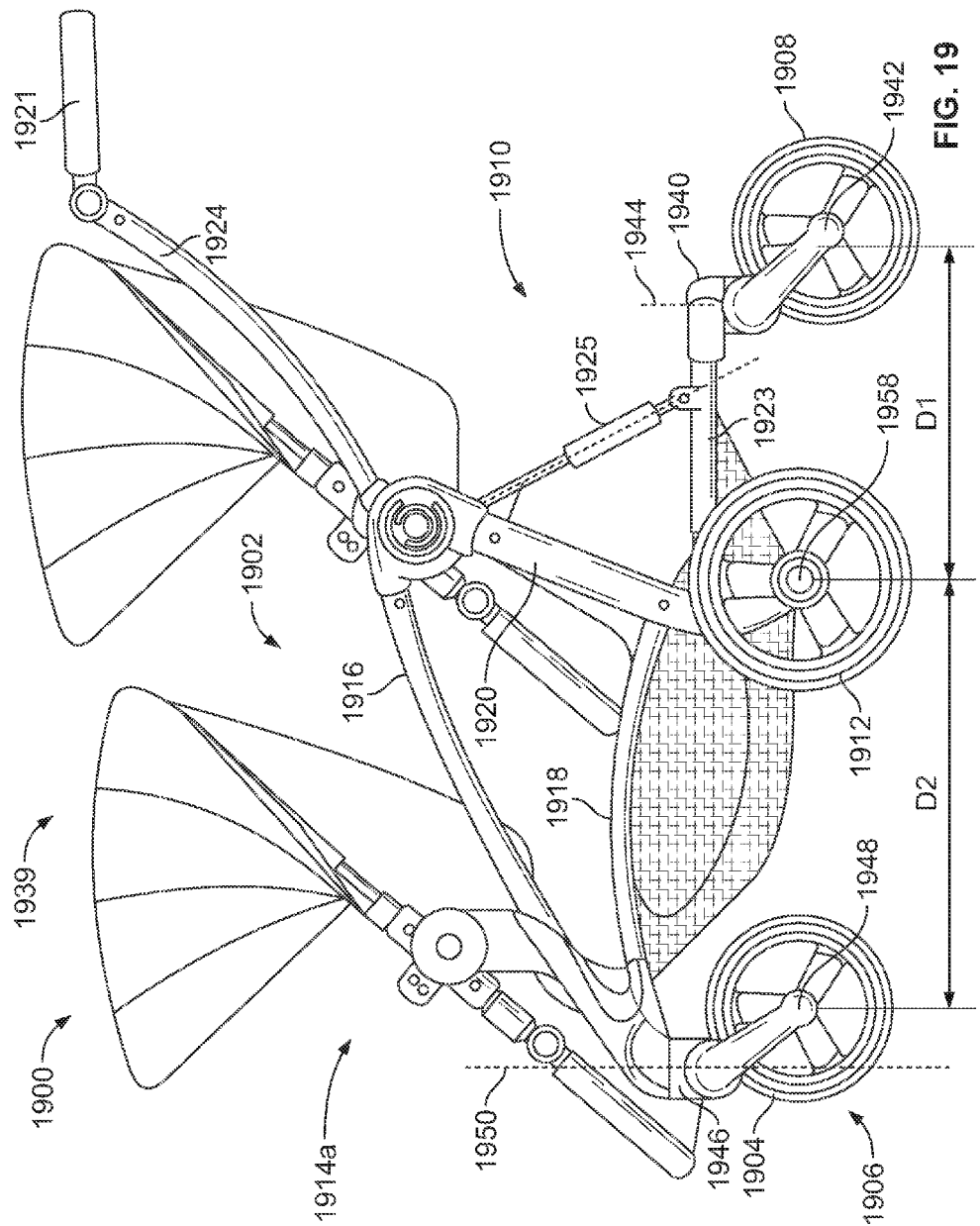

MANEUVERABLE STROLLERS

CROSS REFERENCE TO RELATED APPLICATIONS

This patent arises from a National Stage Application of International Patent Application Serial No. PCT/US2011/062669, filed on Nov. 30, 2011, entitled Maneuverable Strollers, which claims the benefit of U.S. Provisional Patent Application Ser. No. 61/418,161, filed Nov. 30, 2010, entitled Maneuverable Strollers. Both International Patent Application Serial No. PCT/US2011/062669 and U.S. Provisional Patent Application Ser. No. 61/418,161, are hereby incorporated herein by reference in their entireties.

FIELD OF THE DISCLOSURE

The present disclosure relates generally to strollers and, more particularly, to maneuverable strollers.

BACKGROUND OF RELATED ART

Strollers are known in the art. Typically, known strollers include a foldable frame, wheels, and one or more seats to support a child or infant in a seated, prone, and/or lying position. Stroller frames are usually foldable in at least one direction to allow the stroller to collapse to a folded position.

BRIEF DESCRIPTION OF THE DRAWINGS

FIG. 19 is a side view of another example stroller disclosed herein.

DETAILED DESCRIPTION

Figure 1:
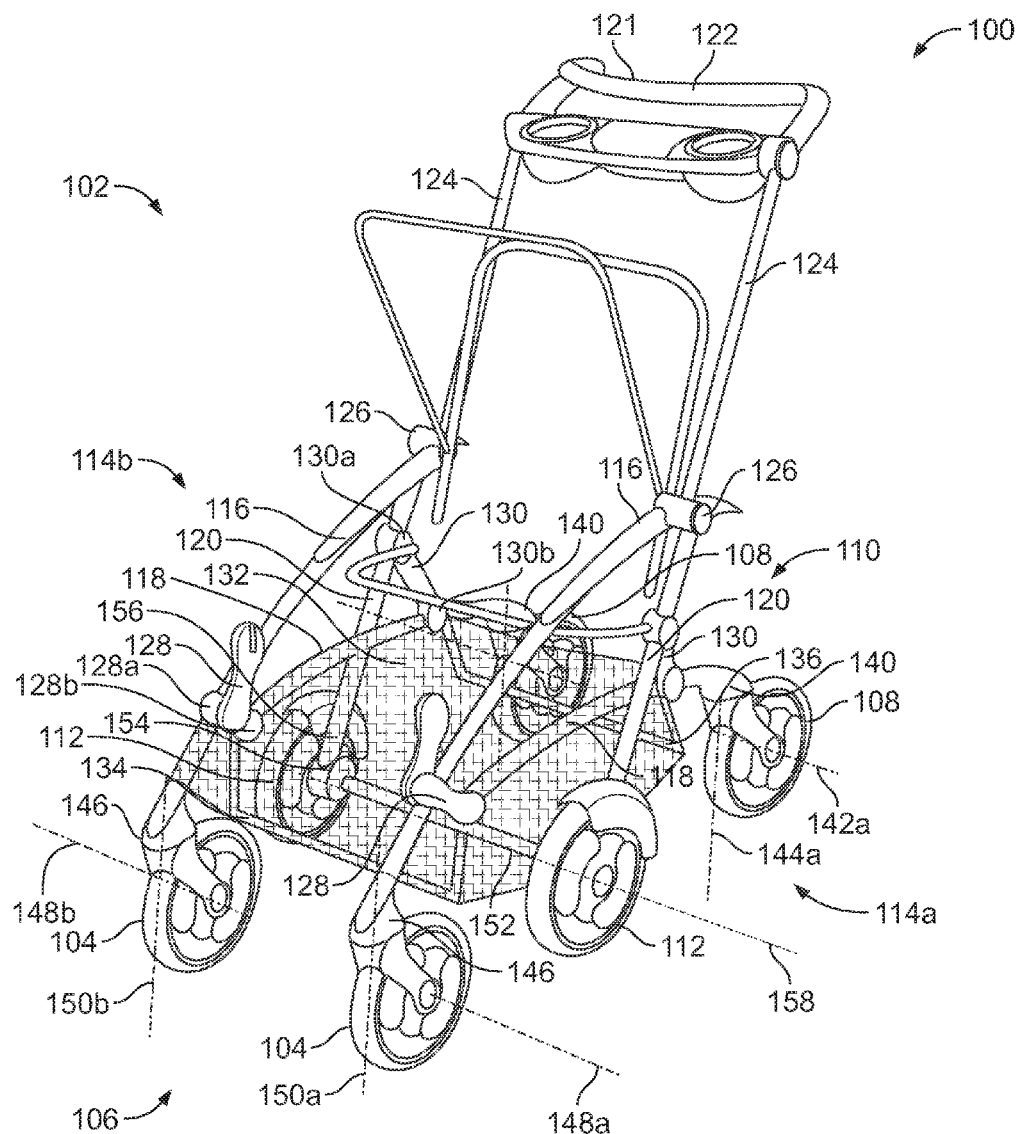
FIG. 1 is a left, front perspective view of an example stroller disclosed herein having two example intermediate wheels and shown with the soft goods of the seat removed.

Known strollers include a frame having one or more seats to support a child or infant in a seated, prone, and/or lying position. To support the frame, strollers often employ one or more front wheels and one or more rear wheels. One or more seats are supported by the frame and are disposed between the front and rear wheels. The front and/or rear wheels support a load or weight of a child seated within the seat. To push the stroller along an intended path, known strollers typically include a handle adjacent the rear wheels. For example, when a child is seated within the seat, a user of the stroller may turn or steer the stroller via the handle to change the orientation or direction of the stroller. However, changing the direction or orientation of a conventional stroller may be difficult due to the weight of a child seated in the stroller. In particular, in some maneuvers one or more of the rear wheels and/or front wheels of a conventional stroller define a turning pivot or axis of a turning curve or path about which the stroller turns or pivots. Further, the weight or load provided by a child seated in the stroller rotates relative to the turning pivot defined by the rear wheels. Thus, because the front and/or rear wheel(s) forming the pivot point are located away from the center of mass of the stroller and its occupant, a user must exert a relatively large force (or torque) to a handle to turn the stroller side to side when a child is seated within the seat. As a result, a user of a conventional stroller typically moves or turns the stroller in an arcuate path having a large turning radius to change the direction of the stroller. Alternatively, in some maneuvers a user lifts a front end of the conventional stroller by pushing down on a handle of the stroller and pivots the stroller on the rear wheel(s) to change the direction of the stroller. This lifting and turning movement may require a significant level of force that may be difficult for some parents. Further, a user often lifts the front end of the conventional stroller to maneuver the stroller over obstacles or curbs. However, lifting the front end of the conventional stroller may require significant force to balance the stroller. In other words, the weight of the stroller shifts toward the rear wheels when the front end is lifted, thereby requiring a greater force to be provided by the user to balance the stroller on the rear wheels.

To facilitate maneuverability of the stroller when a child is seated within the seat, some known strollers employ front wheels and/or rear wheels that can rotate, pivot or swivel relative to the frame about a vertical axis (e.g., an axis that is perpendicular to the axis of rotation of the respective front or rear wheels). Although the swiveling action of the front and/or rear wheels permits a conventional stroller to be more easily turned from side to side, the front and/or rear wheels of some strollers tend to oscillate from side to side or turn at an angle relative to the direction of motion as the stroller is being pushed in a straight or intended path. For example, swivel mounted wheels may permit the wheels to swing out of line from a desired direction due to, for example, irregularities of a surface on which the stroller is being pushed. As a result, the rolling friction of a conventional stroller increases, thereby causing wobble, resistance to pushing and/or making it more difficult for a user to steer the stroller.

Example strollers disclosed herein improve stability, maneuverability and/or steering control of the stroller, and/or provide improved shock absorption relative to some known strollers. Further, example strollers disclosed herein enable a user to turn or pivot an example stroller disclosed herein within a tight turning radius. In some examples, the stroller can turn 360 degrees within its own overall length or dimensional envelope. To enable example strollers disclosed herein to turn within a relatively tight radius, example strollers disclosed herein employ one or more intermediate, pivot-enabling, and/or enlarged wheels. In some examples an intermediate wheel (e.g., a central wheel) is disposed between one or more front wheels that support a front portion of a stroller frame and one or more rear wheels that support a rear portion of the stroller frame. A distance between the front wheels and the rear wheels substantially defines an overall length of the stroller. In some examples, the intermediate wheel is positioned substantially midway between the front and rear wheels and/or substantially below (e.g., directly below) a center of mass of the occupied stroller. In some examples, to further improve steering and/or maneuverability, the intermediate wheel is positioned closer to a rear wheel than a front wheel. In some examples, a distance between a center of the intermediate wheel and a center of the rear wheel is less than a distance between the center of the intermediate wheel and a center of the front wheel. In some examples, positioning the intermediate wheel closer to the rear wheel than the front wheel facilitates lifting of a front end of the stroller when maneuvering the stroller over an obstacle such as, for example, a curb.

To facilitate turning, the intermediate wheel of example strollers disclosed herein is disposed between the front and rear wheels to provide a turning pivot about which the front wheels and the rear wheels rotate as a user turns or maneuvers the stroller (e.g., turns the stroller 360 degrees or some multiple (fraction or otherwise) thereof) about a turning radius or path. To provide a load-bearing pivot, the intermediate wheel or other pivot providing structure of some disclosed examples is beneath (e.g., directly beneath), adjacent and/or aligned with, a seating area of the strollers. As a result, when a child is seated within the seating area, the weight of the child (e.g., a center of mass of the child) is positioned adjacent to or substantially above (e.g., directly above or slightly offset from) the intermediate wheel and, thus, rotates about the pivot pivoting structure or the intermediate wheel as a user turns the example strollers disclosed herein. In some examples, the intermediate wheel provides a load-bearing wheel about which a center of mass of the stroller rotates when a user turns the stroller. As a result, as compared to conventional strollers, less force is required to move or turn the example strollers disclosed herein. Thus, a user can rotate or turn the example strollers disclosed herein within a tight turning radius with relatively low resistance or with relative ease. For example, a relatively small person (e.g., a user weighing about one-hundred pounds) can rotate a tandem stroller disclosed herein having two forty pound children with a relatively small amount of force because the center of mass of the example strollers disclosed herein (and the occupant(s) seated therein) pivots about a substantially centrally located pivot defined by the intermediate wheel and/or other pivot providing structure.

In addition, to facilitate turning of and/or to reduce rolling friction of the example strollers disclosed herein, the intermediate wheel(s) of example strollers disclosed herein have a diameter that is larger than the diameters of the front wheels and that is larger than the diameters of the rear wheels. As a result, there is a vertical offset between an engagement or contact surface of the front and/or rear wheels and the engagement surface or contact surface of the intermediate wheel when such example strollers are moved on a flat, horizontal surface. In some such examples, the lower-most surface of the front and rear wheels are slightly elevated relative to the lower-most surface of the intermediate wheel by, for example, a small vertical distance (e.g., approximately a quarter of an inch, a half of an inch, etc.).

To improve steering, control or maneuverability of the stroller, the front and/or rear wheels may be swivel mounted relative to a frame of the example strollers disclosed herein. Additionally, to reduce (e.g., significantly reduce or prevent) drifting (e.g., side to side shifting) of the stroller when the stroller is being pushed in a path that is intended to be substantially straight, in some examples, the intermediate wheel is fixed against swiveling or rotating relative to its vertical axis. In some examples, the intermediate wheel is mounted to a frame of the stroller for linear movement to provide resistance to lateral drifting of the stroller when the stroller is moving in a substantially straight path. In such examples, because the intermediate wheel is prevented from swiveling or rotating relative to the frame, the intermediate wheel guides the example strollers in a substantially straight path even when the front and/or rears swivel oscillate from side to side or turn at an angle relative to the direction of motion as the stroller is being pushed (e.g., in a straight path). Further, in some such examples the intermediate wheel also has a larger diameter than the front and/or rear wheels, thereby permitting the strollers disclosed herein to roll over rough or uneven surfaces without difficulty.

Additionally or alternatively, for the purpose of providing greater stability and/or to facilitate balancing, some example strollers disclosed herein employ a suspension apparatus. In some such examples, the suspension apparatus provides a reactive force toward a front end of the frame when the front end of the stroller is pivoted upward or away from a surface. In some examples, the suspension apparatus reduces (e.g., significantly reduces or prevents) shifting of the stroller's weight toward the rear wheels (e.g., when a front end of the stroller is lifted, pivoted or tilted to advance past a curb).

FIGS. 1-4 illustrates an example stroller 100 disclosed herein. The example stroller 100 of FIGS. 1-4 includes a frame 102 having one or more front wheels 104 to support a front end 106 of the frame 102 and one or more rear wheels 108 to support a rear end 110 of the frame 102. The frame 102 of the illustrated example is assembled to form a structure which is intended to stay assembled in all phases of its use and storage. Additionally, for the purposes of improving maneuverability, control steering and/or to provide shock absorption, the frame 102 of the illustrated example employs two intermediate wheels 112 disposed between the front and rear wheels 104, 108. In the illustrated example, the intermediate wheels 112 are positioned on opposite sides of the frame 102 approximately midway between the front and rear wheels of the corresponding side and in alignment with a respective pairs of the front and rear wheels.

Figure 2:
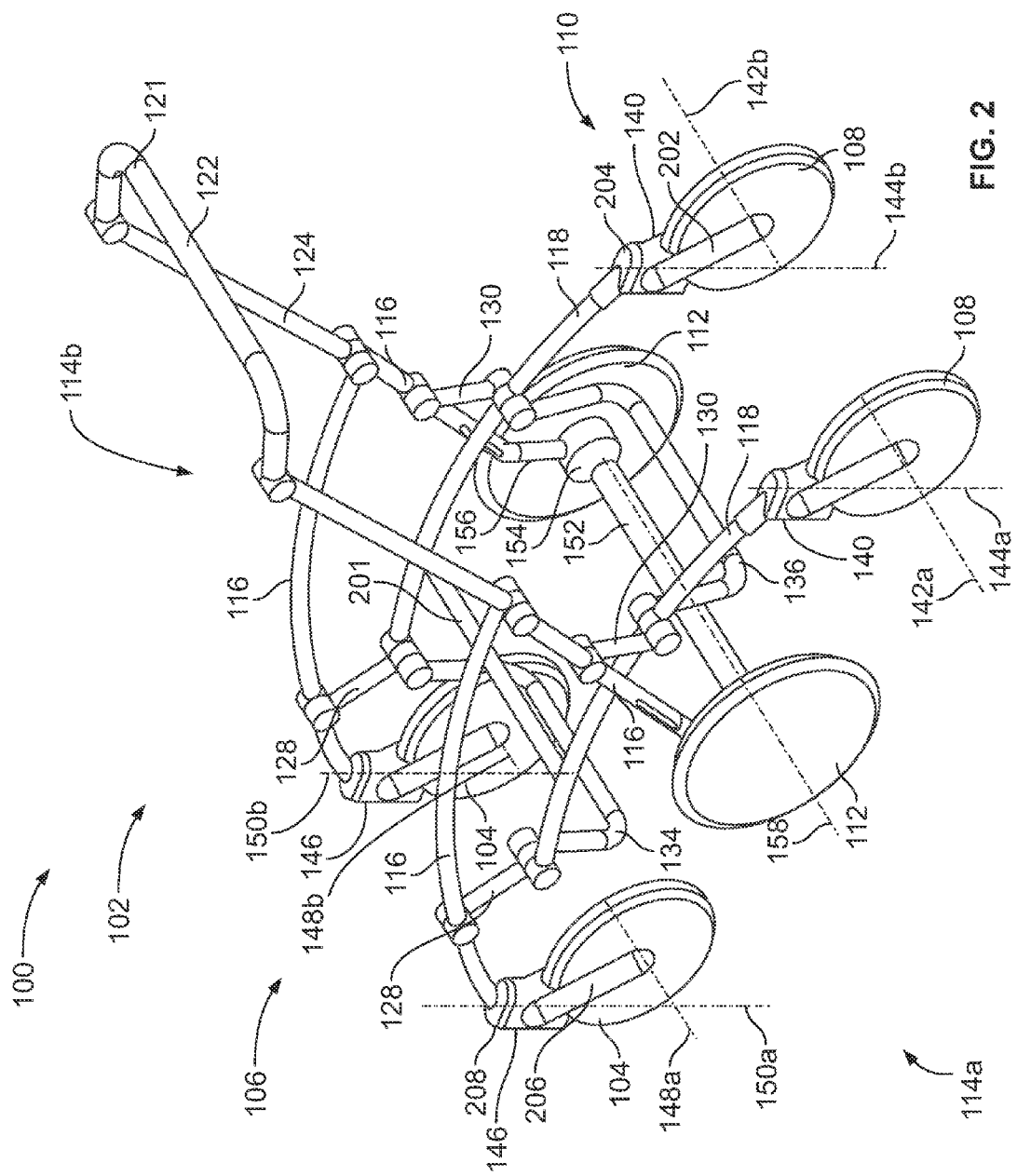
FIG. 2 is a left, rear perspective view of the example stroller of FIG. 1.

To accommodate a child and/or infant seat, the frame 102 of the illustrated example includes a first side frame assembly 114a laterally spaced from a second side frame assembly 114b. The first and second side assemblies 114a, 114b are connected via a cross bar 201 (FIG. 2). The first and second side frame assemblies 114a, 114b of the illustrated example are substantially similar or identical and are symmetrical. Each of the first and second side frame assemblies 114a, 114b of the illustrated example includes a generally curved upper frame support 116, a generally curved lower frame support 118, and a generally straight intermediate frame support 120. However, the upper, lower and intermediate frame supports 116, 118, 120 may be any shape, including a substantially linear (e.g., straight and/or flat) shape or a shape having one or more curved and/or linear portions.

To enable a user to push the stroller 100 of the illustrated example, the frame 102 includes a handle 121 having a grip 122 supported by a handle frame support 124. The handle 121 of the illustrated example extends between the side frame assemblies 114a, 114b and may be formed from a single tube that is bent into a generally U-shaped structure. The example handle 121 of the illustrated example defines the gripping section 122 where the user may take hold of the handle 121 to move, control and/or steer the stroller 100. Further, the handle 121 of the illustrated example is adjacent the rear wheels 108. When the stroller of the illustrated example is in an erected (e.g., in-use) position as shown in FIGS. 1-4, the lower end of the handle frame supports 124 are substantially parallel to, or aligned with, respective ones of the intermediate frame supports 120.

For the purpose of enabling the stroller 100 of the illustrated example to fold or collapse in at least one direction, the frame supports 116, 118, 120 and/or 124 of each side frame assembly 114a, 114b are pivotally coupled. In the illustrated example, the upper frame support 116, the intermediate frame support 120 and the handle frame support 124 of the side frame assembly 114a are pivotally coupled at a first connector or pivot joint 126. Similarly, the frame supports 116, 120 and 124 of the side frame assembly 114b are pivotally coupled at a second connector or pivot joint 126. Likewise, the lower frame support 118 of each side frame assemblies 114a, 114b is pivotally coupled to a respective upper frame support 116 and intermediate frame support 120 via fore and aft links 128 and 130. In the illustrated example, the fore link 128 of each side frame assembly 114a, 114b is pivotally coupled to respective upper and lower frame supports 116, 118 via respective connectors or pivot joints 128a, 128b. Likewise, the aft link 130 of each side frame assembly 114a, 114b is pivotally coupled to respective intermediate and lower frame supports 120, 118 via respective connectors or pivot joints 130a, 130b. To support and/or shape, for example, soft goods forming a cargo basket 132, the frame 102 of the illustrated example employs front and rear frame supports 134 and 136 extending between the lower frame supports 118 of the first and second side frame assemblies 114a, 114b.

To mount or attach the rear wheels 108 to the lower frame support 118 of the respective side frame assemblies 114a, 114b, each of the rear wheels 108 of the illustrated example includes a rear wheel housing 140. The example rear wheel housing 140 of FIG. 2 includes a fork or wheel support 202 rotatably mounted to a connector 204. Each rear wheel is rotatably journalled between arms of a respective rear wheel support 202 of FIG. 2 to enable each of the rear wheels 108 to rotate independently about a separate axis of rotation 142a, 142b (e.g., each of which is a substantially horizontal axis relative to a level ground surface on which the stroller is positioned). Additionally, to improve steering, each of the rear wheels 108 of the illustrated example is able to rotate or pivot about a substantially vertical axis 144a, 144b substantially perpendicular to the respective axis of rotation 142a, 142b. Thus, the rear wheels 108 of the illustrated example rotate about an axis of rotation 142a, 142b and can pivot, swivel or rotate relative to the frame 102 about a vertical axis 144a, 144b. In the illustrated example, the rear wheels 108 are swivel casters and their ability to pivot about a respective vertical axis 144a, 144b is implemented by a pivot connector between the corresponding wheel support 202 and the corresponding connector 204.

For the purpose of mounting or attaching the front wheels 104 of the illustrated example to respective ones of the side frame assemblies 114a, 114b, each of the front wheels 104 of the illustrated example includes a front wheel housing 146. Each of the example front wheel housings 146 of FIG. 2 includes a fork or wheel support 206 rotatably mounted to a connector 208. Each front wheel 104 is rotatably journalled between arms of a respective front wheel support 206 of FIG. 2 to enable each of the front wheels 102 rotate independently about a separate axis of rotation 148a, 148b (e.g., a substantially horizontal axis relative to a level ground surface on which the stroller is positioned). Additionally, to improve steering, each of the front wheels 104 of the illustrated example is able to rotate or pivot about a corresponding substantially vertical axis 150a, 150b that is substantially perpendicular to the corresponding axis of rotation 148a, 148b. Thus, the front wheels 104 of the illustrated example rotate about an axis of rotation 148a, 148b and can pivot, swivel or rotate relative to the frame 102 about a vertical axis 150a, 150b. In the illustrated example, the front wheels 104 are swivel casters and their ability to pivot about the corresponding vertical axis 150a, 150b is implemented by a pivot connector between the corresponding wheel support 206 and the corresponding connector 208.

In the illustrated example of FIGS. 1-4, the intermediate wheels 112 are coupled to respective ones of the first and second side frame assemblies 114a, 114b. More specifically, each intermediate wheel 112 is coupled to the frame 102 of the illustrated example via a respective intermediate frame support 120 of the respective first and second side frame assemblies 114a, 114b.

To couple the intermediate wheels 112 to the intermediate frame supports 120, the intermediate wheels 112 of the illustrated example are mounted on an axle 152 extending between the first and second side frame assemblies 114a, 114b. To receive the axle 152, each of the intermediate frame supports 120 includes a spindle or a bearing housing 154 coupled to an arm 156 of the intermediate frame support 120. The intermediate wheels 112 of the illustrated example rotate relative to an axis of rotation 158 of the axle 152. However, while the intermediate wheels 112 of the illustrated example are able to rotate about the axle 152, the intermediate wheels 112 are otherwise fixed relative to the frame 102. In this manner, the intermediate wheels 112 are mounted to the frame 102 of the stroller 100 for linear movement to provide resistance to lateral drifting of the stroller 100 when the stroller 100 is moving or being pushed in a substantially straight path. In other words, the intermediate wheels 112 of the example of FIGS. 1 and 2 cannot swivel relative to the frame 102 of the illustrated example. However, in other examples, the intermediate wheels 112 can swivel relative to the frame 102.

The intermediate wheels 112 of the illustrated example are disposed between the front and rear wheels 106, 108. The intermediate wheels 112 define pivots or points around which the stroller 100 of the illustrated example may be turned. In other words, each intermediate wheel 112 of the illustrated example defines a pivot providing structure disposed about midway between the front and rear wheels 104, 108. Consequently, both the front end 106 of the stroller 100 and the rear end 110 of the stroller 100 pivot or rotate in an arcuate path relative to the pivot providing structure provided by the intermediate wheels 112 when a user turns the stroller 100 of the illustrated example.

For example, when applying sufficient force to the handle 121 of the stroller 100 of the illustrated example in a leftward direction relative to the orientation of a user standing behind the stroller and gripping the handle 121 (e.g., a clockwise direction looking down from above the stroller 100), the stroller 100 pivots about the intermediate wheel 112 of the second side frame assembly 114b such that the front wheels 106 move along an arcuate path in a direction toward the second side frame assembly 114b and the rear wheels 108 move along an arcuate path in a direction toward the first side frame assembly 114a. Likewise, when a user turns the handle 121 of the stroller 100 in a rightward direction relative to the orientation of a user gripping the handle 121 (e.g., a counter-clockwise direction looking from above the stroller 100), the stroller 100 pivots about the intermediate wheel 112 of the first side assembly 114a such that the front wheels 106 move along an arcuate path in a direction toward the first side frame 114a and the rear wheels 108 move along an arcuate path in a direction toward the second side frame 114b.

Because the intermediate wheels 112 are located substantially beneath (e.g., aligned with) a seating area of the stroller 100, the intermediate wheels 112 absorb a substantial portion of a load provided by a child sitting in a seat of the stroller 100 of the illustrated example. In other words, in the illustrated example, a load or weight of a child sitting in the seating area is largely carried by the intermediate wheels 112 when a user turns the stroller 100 of the illustrated example. As a result, a load provided by the child rotates about a pivot point provided by one of the intermediate wheels 112. In this manner, the combined load or weight of the stroller 100 and a child in the stroller 100 requires less force (or torque) to turn or pivot the stroller 100 (e.g., via the handle 121) then would be required by a stroller and a child of similar combined weight without the intermediate wheels 112. Because the weight (or the center of mass) of a child in the stroller 100 of the illustrated example is close to the pivot axis or pivot point of the intermediate wheel 112, the force or torque required to pivot or turn the stroller 100 of the illustrated example when a child is seated in the seating area is relatively low. As a result, the stroller 100 of the illustrated example can turn about a pivot point provided by either of the intermediate wheels 112 with a relatively tight turning radius and with relative ease.

To provide shock absorption to the example stroller 100, the intermediate wheels 112 of the illustrated example are implemented by air inflatable wheels composed of rubber.

Further, the intermediate wheels significantly reduce or prevent lateral drifting (e.g., side to side movement) of the stroller 100 when the stroller 100 is moving in a substantially straight path because the intermediate wheels 112 of the illustrated example do not swivel. Thus, the intermediate wheels 112 provide a guide to maintain the stroller 100 on a substantially straight path. The intermediate wheels 112 of the illustrated example guide the example stroller 100 of the illustrated example in a substantially straight path even when the front and/or rear wheels 104, 108 swivel or oscillate from side to side or turn at an angle relative to the direction of motion as the stroller 100 is being pushed along a path intended to be straight because engagement surfaces 304, 306 of the respective front and rear wheels 104, 106 are elevated relative to the engagement surface 302 of the intermediate wheels 112. As a result, the front and/or rear wheels 104, 106 may lift and/or disengage the ground surface when subjected to frictional force attempting to swivel them from a current straight path.

Figure 3:
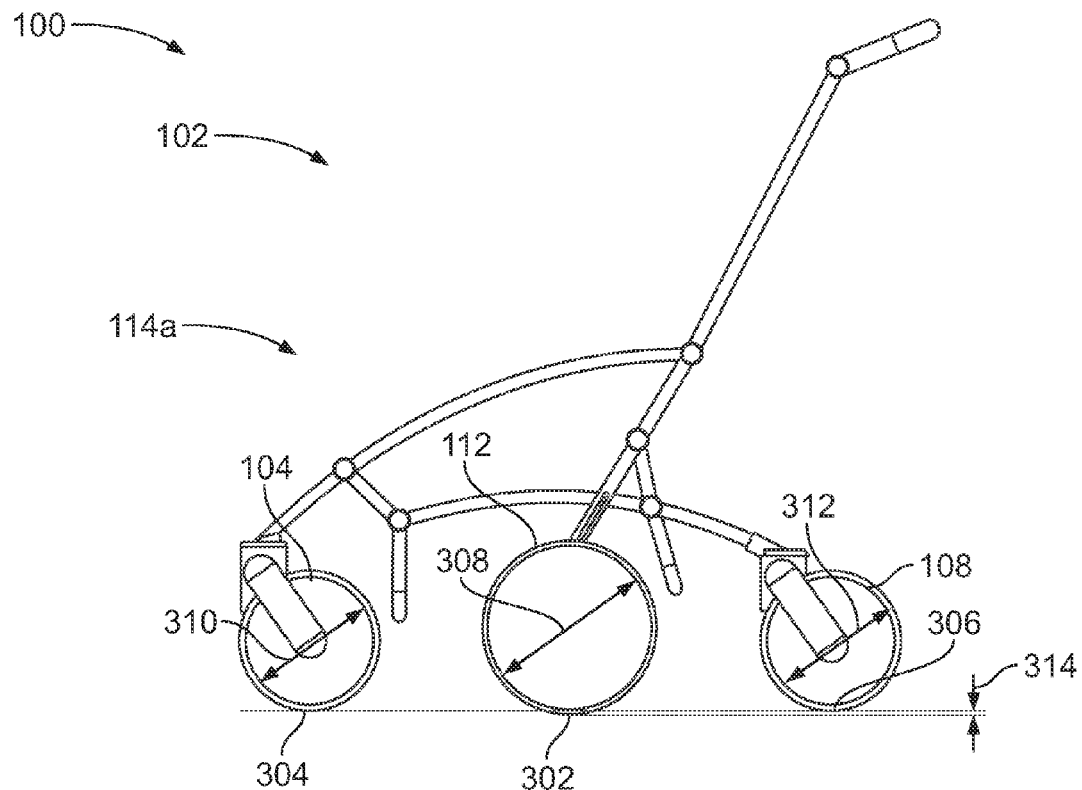
FIG. 3 is side view of the example stroller of FIGS. 1 and 2.

FIG. 3 is a side view of the example stroller 100 of FIGS. 1-3. FIG. 3 illustrates an example offset of a distance 314 (e.g., 0.50 inches) between a ground engagement surface 302 of the intermediate wheel 112 and ground engagement surfaces 304, 306 of the front and rear wheels 104, 108. In addition, the intermediate wheel 112 has a first diameter 308 that is larger than second and third diameters 310, 312 of the respective front and rear wheels 104, 108. In this example, the second and third diameters 310, 312 are substantially the same. Thus, the engagement surfaces 304, 306 of the front and rear wheels 104, 108 engage a surface with a relatively smaller portion or contact area than the engagement surface 302 of the intermediate wheel 112. As a result, rolling friction of the front and/or rear wheels 104, 108 is reduced because the ground engagement surfaces 304, 306 of the respective front and rear wheels 104, 108 are relatively small compared to the contact surface 302 of the intermediate wheels 112. Further, the larger diameter of the intermediate wheels 112 permits the stroller 100 of the illustrated example to roll over rough or uneven surfaces without difficulty.

Figure 4:
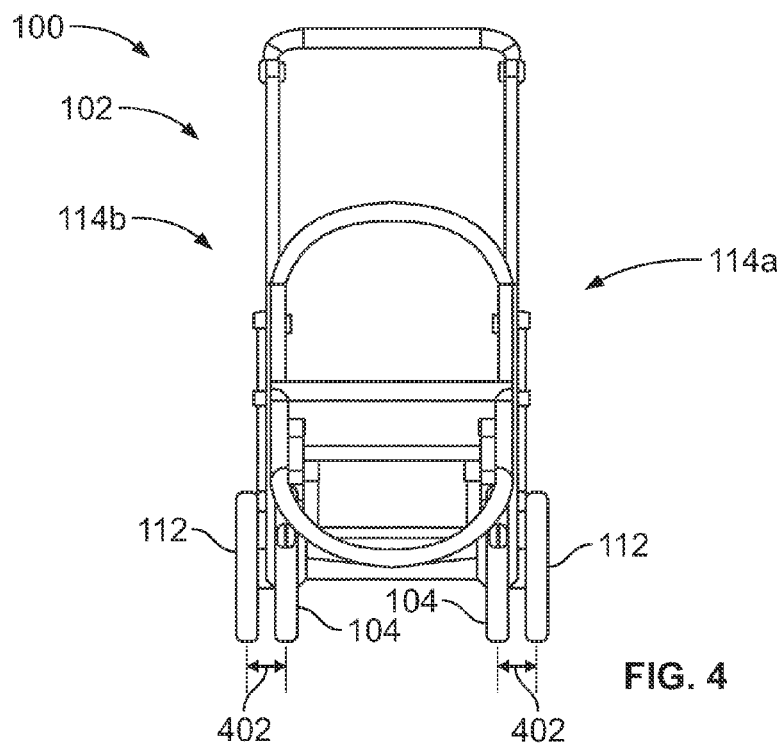
FIG. 4 is a front view of the example stroller of FIGS. 1-3.

FIG. 4 is a front view of the example stroller 100 of FIG. 1-3. Referring to FIG. 4, for the purposes of improving stability and/or to facilitate collapsing the stroller 100 with little or no interference, the intermediate wheels 112 of the illustrated example are offset a horizontal distance 402 relative to the front and/or rear wheels 104, 108. More specifically, the intermediate wheels 112 of the illustrated example extend outside of a line or path along which the front and rear wheels 104, 108 fall. While the intermediate wheels 112 of FIG. 4 are spaced a further distance from a longitudinal center line of the stroller 100 than the front and rear wheels 104, 108, in other examples, the intermediate wheels 112 may be aligned with the front and rear wheels 104, 108 and/or may be offset inward of the front and/or rear wheels 104, 108 (i.e., be closer to the longitudinal center line) and/or offset outbound of a first one of the front and rear wheels and inbound of a second different one of the front and rear wheels.

Figure 5:
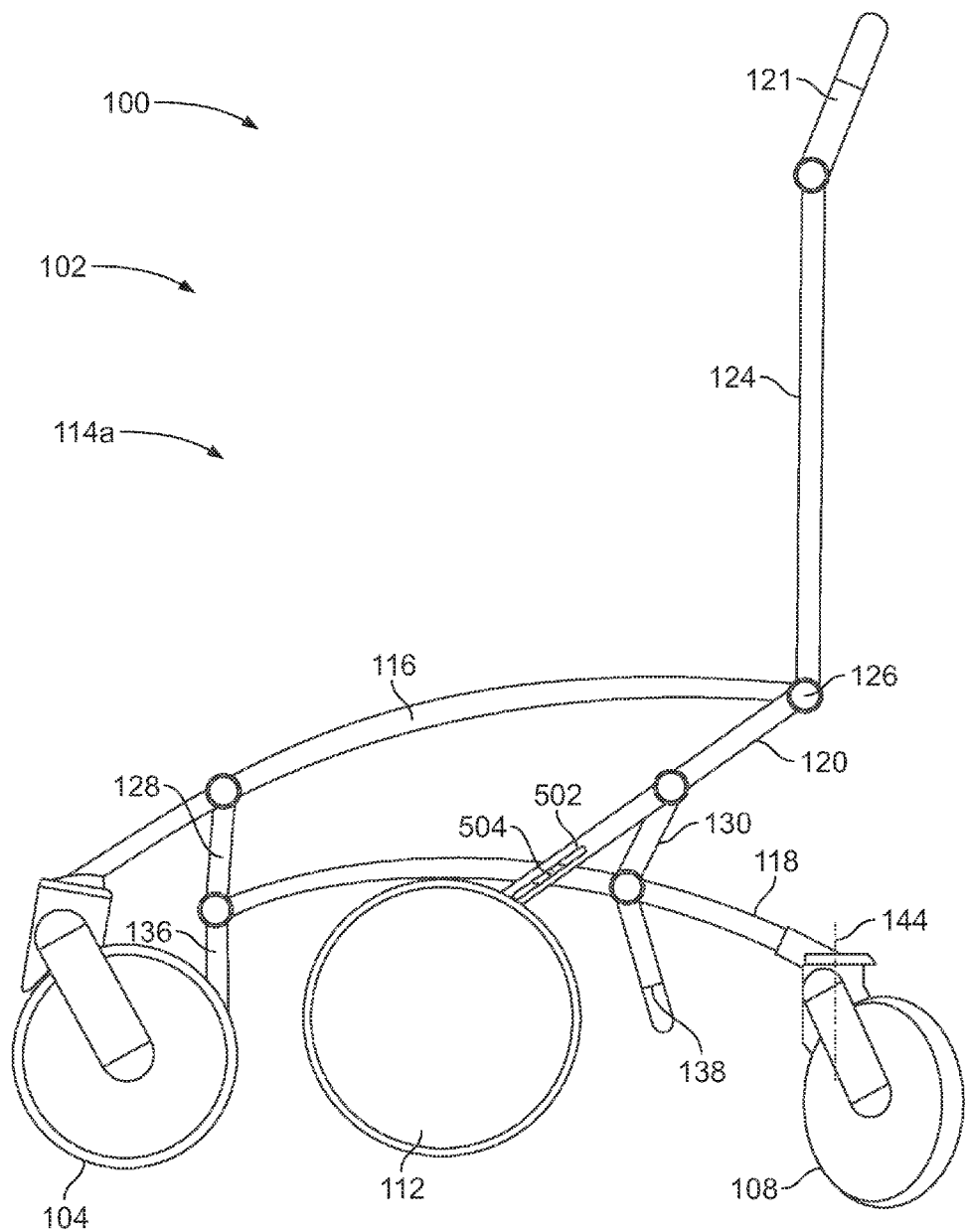
FIG. 5 is a side view of the example stroller of FIGS. 1-4, showing the stroller partially collapsed.
Figure 6:
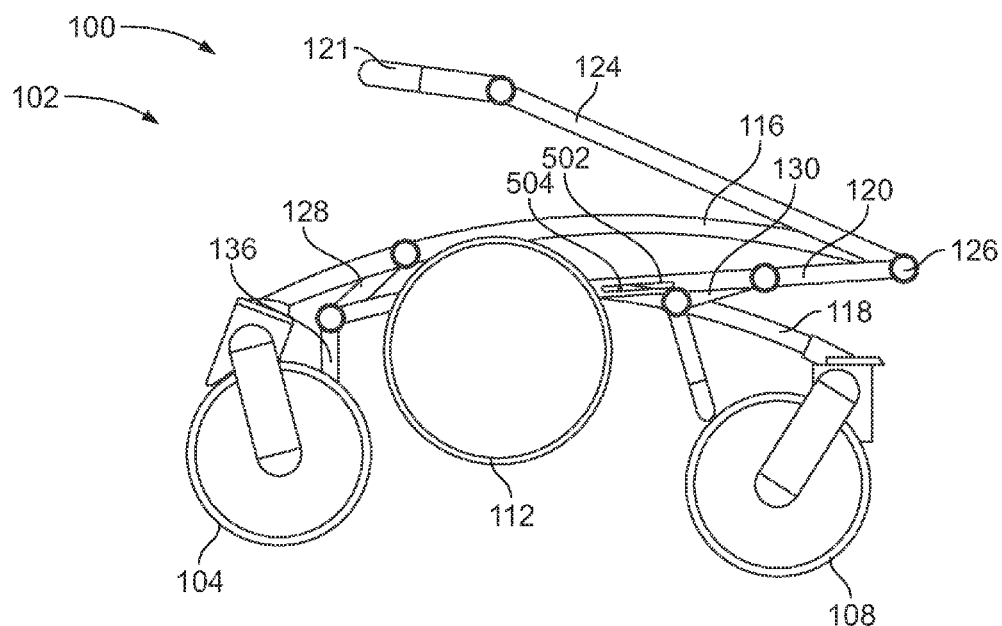
FIG. 6 is a side view of the example stroller of FIGS. 1-5, showing the stroller further collapsed.
Figure 7:
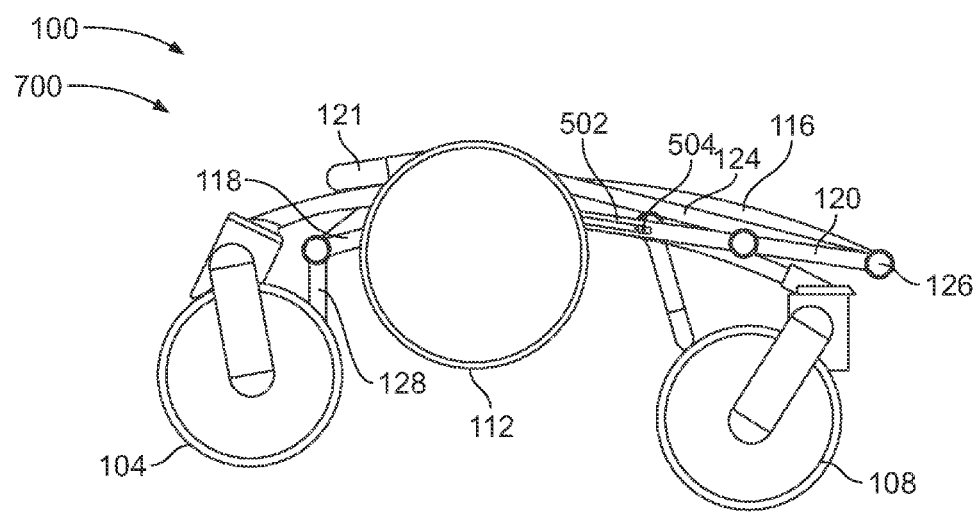
FIG. 7 is a side view of the example stroller of FIGS. 1-6, showing the stroller fully collapsed.

The intermediate wheels 112 of the illustrated example do not substantially increase the overall dimensional envelope of the stroller 100 of the illustrated example. In particular, the intermediate wheels 112 do not affect the ability of the stroller 100 of the illustrated example 100 to collapse with a compact profile. FIGS. 5-7 illustrate the example stroller 100 of FIG. 1 being folded from an in-use unfolded position shown in FIGS. 1-4 to a collapsed, folded, or storage position 700 shown in FIG. 7. As noted above, the side frame assemblies 114a, 114b are constructed such that the entire stroller 100 of the illustrated example is selectively moveable between an extended, unfolded, in-use position 700 (FIGS. 1-4) and a collapsed, folded, or storage position (FIG. 7). The stroller 100 of the illustrated example has a low profile or compact dimensional envelope when the stroller 100 is in the collapsed position. The intermediate wheels 112 of the illustrated example do not significantly increase the overall dimensional envelope of the stroller 100 of the illustrated example when the stroller 100 is in the unfolded position (FIGS. 1-4) and/or the folded position 700 (FIG. 7).

To maintain the stroller 100 in the use or unfolded position, the stroller 100 of the illustrated example includes a latch mechanism. The latch mechanism of the illustrated example includes a latch plate that may be secured by a detent, a lock, spring, and/or otherwise prevented from moving to lock and maintain the frame 102 of the illustrated example in the in-use position. To collapse the stroller 100 of the illustrated example, the latch mechanism is released via any suitable means (e.g., switch, lock release, pull cord, etc.) to allow the handle frame support 124 to pivotally rotate towards the upper frame support 116 into the configuration illustrated in FIGS. 5, 6 and 7. The latch mechanism employed is immaterial to this disclosure.

Referring to FIG. 5, when the latch mechanism is released, the handle frame support 124 is freed to rotate relative to the upper frame support 116 and the intermediate frame support 120 via the hinge or pivot connector 126. In particular, the handle frame support 124 of the illustrated example pivots toward the upper frame support 116. To enable the intermediate frame support 120 to rotate, slide, or laterally shift relative to the lower frame support 118, the intermediate frame support 120 of the illustrated example includes a slot 502 (see FIG. 6). The slot 502 receives a pin 504 coupled (e.g., integrally formed) with the lower frame support 118 to guide the intermediate frame support 120 relative to the lower frame support 118. As the intermediate frame support 120 pivots, it lifts the intermediate wheel 112.

As shown in FIG. 6, the upper frame support 116 and the intermediate frame support 120 of the illustrated example rotate relative to the lower frame support 118 via the links 128 and 130, respectively. As shown in FIG. 7, in the fully collapsed, folded or storage position 700, the stroller 100 of the illustrated example has a relatively low profile or dimensional envelope and a relatively small profile when the stroller 100 is in the collapsed position 700 of FIG. 7.

Although for clarity they are not shown in FIGS. 1-7, the stroller 100 is provided with suitable soft goods to form a seat and/or basket. The stroller 100 may additionally be provided with a tray that may function as a passive restraint for a seated occupant of the stroller. The arrangement and connection of the frame supports 116, 118, 120, and/or 124 of the side frame assemblies 114a, 114b shown in the figures is for illustrative purposes only. Other arrangements of the frame supports 116, 118, 120, and/or 124 may be used, and the arrangements may include additional supports not shown in the figures, or may decrease the number of members shown. Other example frame supports and/or frames are disclosed below in connection with FIGS. 8-17. Further, while the side frame assemblies 114a, 114b of the illustrated example are generally symmetrical, such that the first side frame 114a is a mirror image of the second side frame 114b, the frame 102 need not be symmetrical. In addition, although the example stroller 100 includes two intermediate wheels 112, other example strollers employ one intermediate wheel 112 or more than two intermediate wheels 112. For example, the stroller 100 may include a third intermediate wheel disposed on the axle 152 between the first and second intermediate wheels 112 of the respective first and second side frame assemblies 114a, 114b. Also, while the pivotal connections 126, 128, 130 are configured as they are shown in the figures and explained herein, other configurations may be additionally or alternatively utilized. Similarly, while a collapsible frame 102 is shown, some example strollers may not collapse.

Figure 8:
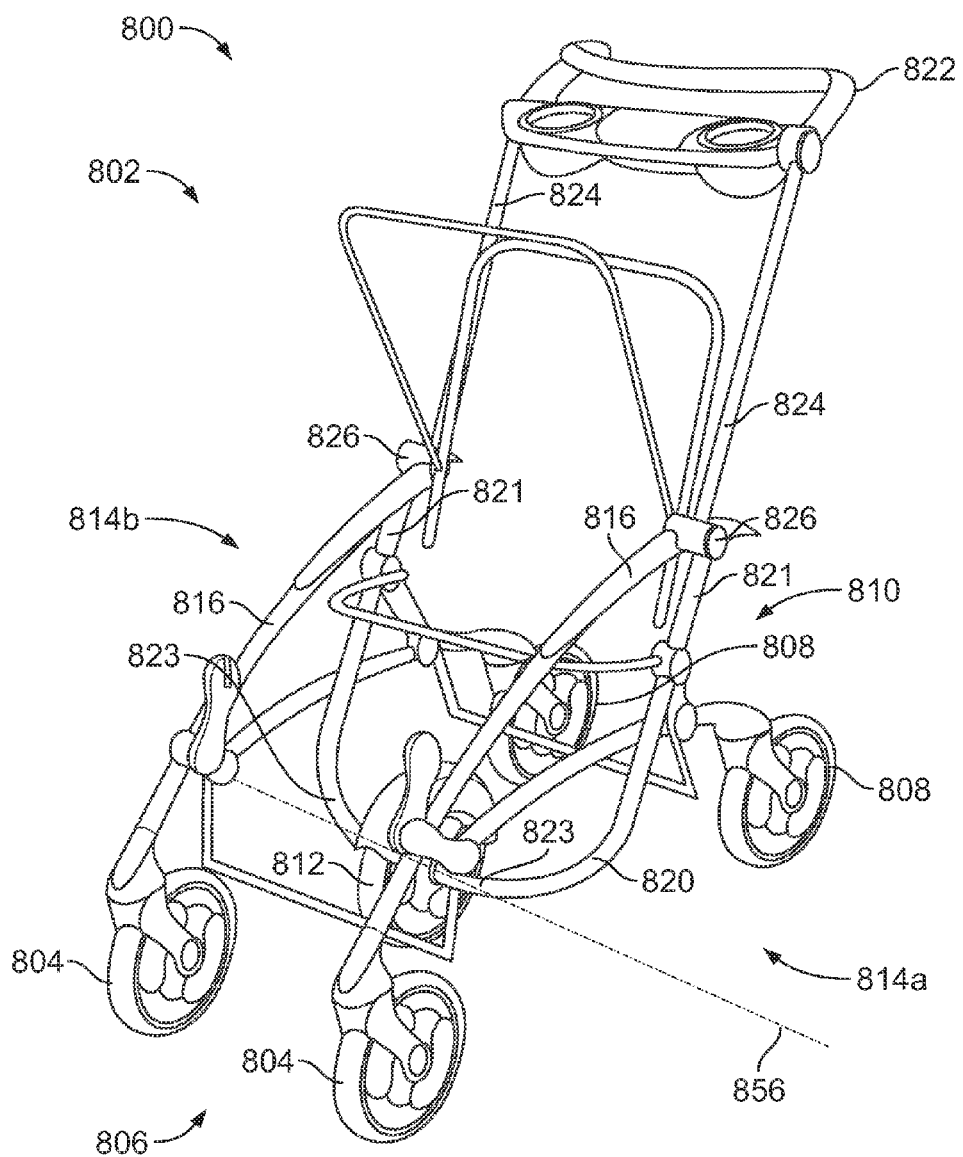
FIG. 8 is a left, front perspective view of another example stroller disclosed herein having only one example intermediate wheel.

FIG. 8 illustrates another example stroller 800 disclosed herein. Those components of the example stroller 800 that are substantially similar or identical to the components of the example stroller 100 described above and that have functions substantially similar or identical to the functions of those components will not be described in detail again below. Instead, the interested reader is referred to the above corresponding descriptions. To facilitate this process, similar reference numbers will be used for like structures. For example, in the illustrated example of FIG. 8, the example stroller 800 includes a frame 802 having one or more front wheels 804 to support a front end 806 of the frame 802 and one or more rear wheels 808 to support a rear end 810 of the frame 802. The frame 802 of the illustrated example includes a first side frame assembly 814a and a second side frame assembly 814b laterally spaced from each other to accommodate an infant seat extending between the side frame assemblies 814a, 814b.

In contrast to the example stroller 100, the example stroller 800 of FIG. 8 includes one centrally located intermediate wheel 812. Specifically, the intermediate wheel 812 of the example of FIG. 8 is located on a central longitudinal axis bisecting the stroller frame into two substantially equal halves. To mount the intermediate wheel 812 to the stroller 800, the frame 802 includes an intermediate frame support 820. The intermediate frame support 820 has a generally U-shaped profile or shape. First ends 821 of the intermediate frame support 820 of the illustrated example are pivotally coupled to handle frame supports 824 and upper frame supports 816 of the frame 802 via connectors 826. The intermediate wheel 812 is rotatably mounted to second ends 823 of the intermediate frame support 812. The intermediate wheel 812 is mounted to rotate about a horizontal axis of rotation 856. However, the intermediate frame support 820 of the illustrated example prevents the intermediate wheel 812 from swiveling relative to the frame 802.

The intermediate wheel 812 of the illustrated example is centrally located halfway between the front and rear wheels 804, 808 and halfway between the side frame assemblies 814a, 814b (e.g., at a point equidistant between the front and rear wheels 804, 808 and equidistant between the side frame assemblies 814a, 816b). In operation, when a user turns the stroller 800 of the illustrated example via a handle 822 (e.g., provides a force to the handle 822 having a component in a direction generally parallel to the axis 856), the front wheels 804 and the rear wheels 808 rotate about the intermediate wheel 812. In the illustrated example, the intermediate wheel 812 provides a pivot point for the stroller 800 that is offset or laterally spaced from the rear end 810 of the stroller 800. Additionally, the intermediate wheel 812 is located beneath a seating area such that a load or weight of a child sitting within the seating area (e.g., a center of mass) rotates about the pivot point provided by the intermediate wheel 812. As a result, a user can rotate the stroller 800 with relative less resistance or force than, for example, a conventional stroller that does not include the intermediate wheel 812.

Figure 9:
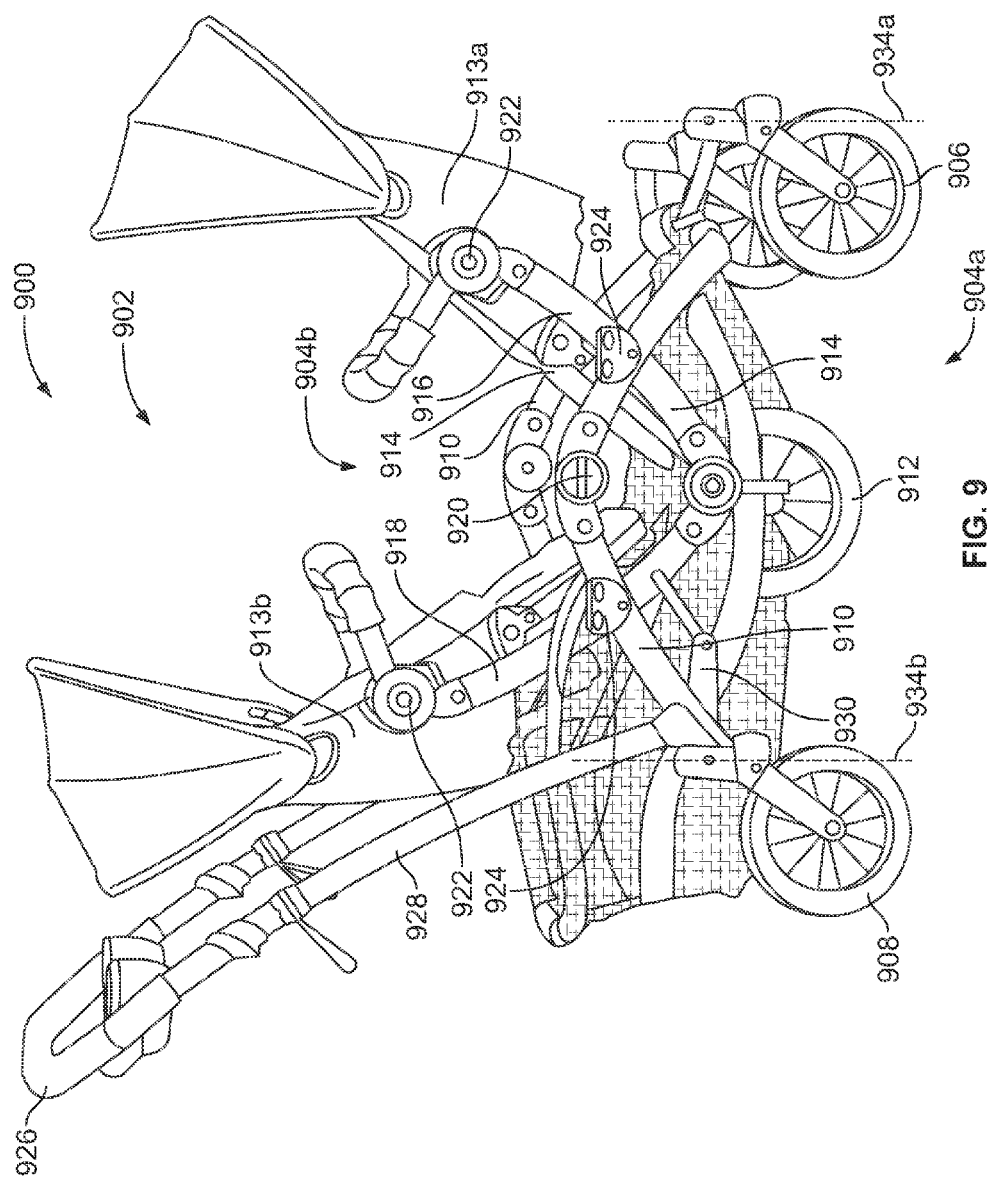
FIG. 9 is a side view of an example tandem stroller disclosed herein having an example intermediate wheel.
Figure 10:
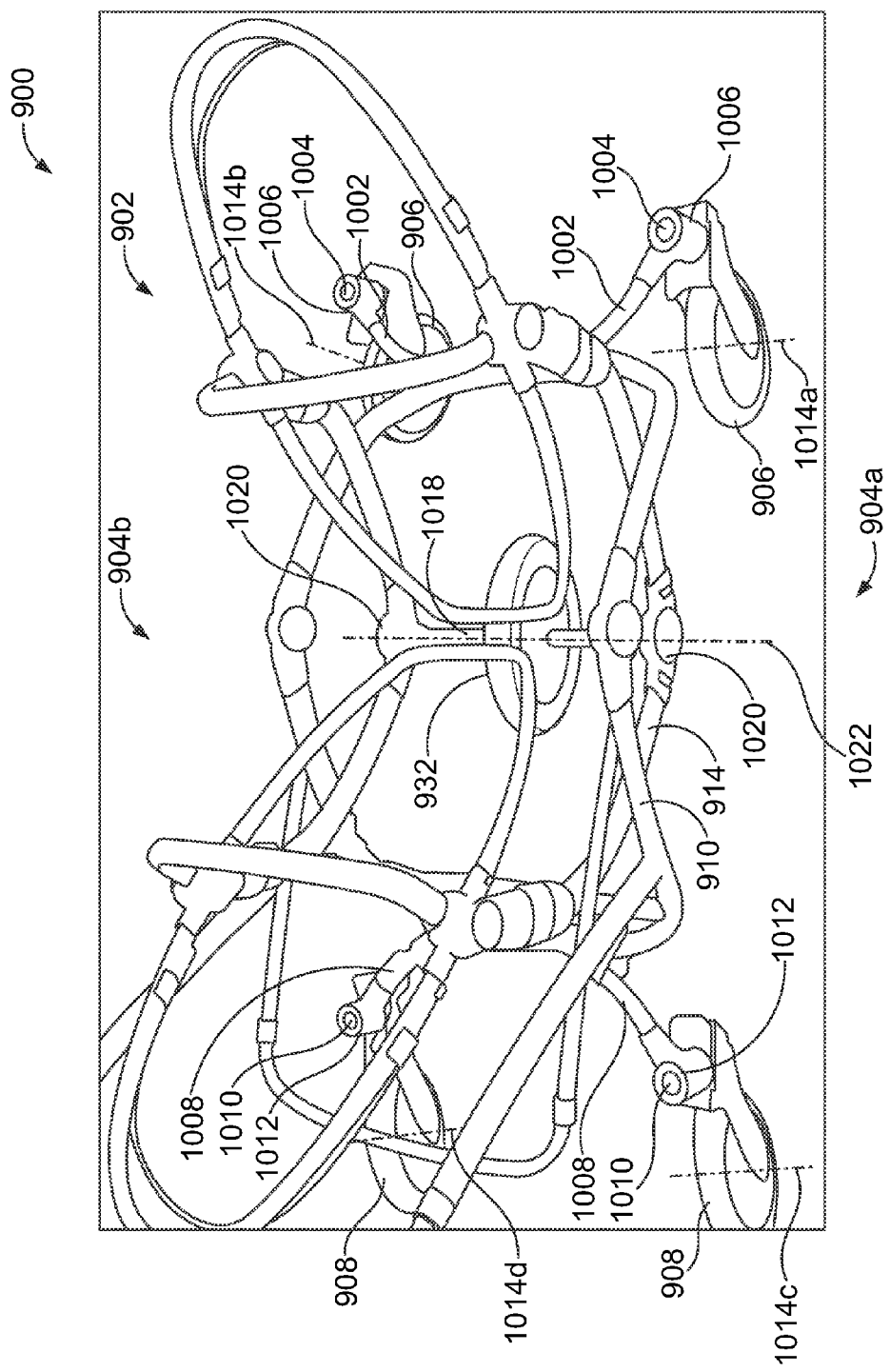
FIG. 10 is a top perspective view of the example stroller of FIG. 9.

FIG. 9 illustrates an example tandem stroller 900 disclosed herein. FIG. 10 is a perspective plan view of the example stroller 900 of FIG. 9. Referring to FIGS. 9 and 10, the example stroller 900 includes a frame 902 having a first side frame assembly 904a and a second side frame assembly 904b. To support one or more front wheels 906 and one or more rear wheels 908, the frame 902 of the illustrated example employs a wheel frame support 910. To support one or more seats 913a, 913b, each of the first and second side frame assemblies 904a, 904b includes a seat frame support 914. In particular, the seat frame supports 914 of the illustrated example include a first arm 916 to receive or support the first seat 913a and a second arm 918 to support or receive a second seat 913b. The first and second arms 916, 918 of the seat frame support 914 of the illustrated example are pivotally coupled at a pivot or hinge 920. To removably couple the seats 913a, 913b to the seat frame support 914, the seat frame support 914 employs hubs 922. The hubs 922 receive or engage with a mating hub or surface of the seats 913a, 913b via, for example, a bayonet connection to couple the seats 913a, 913b to the frame 902.

Additionally, for the purpose of allowing the stroller 900 of the illustrated example to collapse to a folded position, the wheel frame support 910 of the illustrated example is pivotally coupled to the seat frame support 914 via connectors or fasteners 924 (e.g., couplers, rivets, pins, etc.). Thus, when the wheel frame support 910 collapses, the seat frame support 914 also collapses. In the example in-use or unfolded position shown in FIG. 9, the seat frame support 914 has a V-shaped profile and the wheel frame support 910 has an inverted V-shaped profile. For the purposes of enabling a user to move the stroller 900 of the illustrated example, the frame 902 includes a handle 926 supported by two handle frame supports 928. The handle frame supports 928 of the illustrated example are pivotally coupled to respective ones of the wheel frame supports 910 and the seat frame supports 914 via linkage assemblies 930.

To further improve stability, maneuverability, control and/or steering of the stroller 900 of the illustrated example, the example stroller 900 includes an intermediate wheel 912. In this example, the intermediate wheel 912 is disposed midway between the front and rear wheels 906, 908 and is disposed midway between the first and second side frame assemblies 904a, 904b on a central longitudinal axis bisecting the stroller into substantially equal left and right halves. The intermediate wheel 912 has a diameter that is substantially larger than diameters of the front and rear wheels 906, 908. In addition, the intermediate wheel 912 is a rubber, air inflatable tire. However, in other examples, the intermediate wheel 912 may be composed of plastic, solid rubber or any other suitable material.

FIG. 10 is a top perspective view of the example stroller 900 of FIG. 10. Referring to FIG. 10, to mount the front wheels 906 to respective ones of the wheel frame support 910 of the first and second side frame assemblies 904a, 904b, the frame 102 includes front arms 1002. To pivotally or rotatably couple the front wheels 906 relative to the frame 902, a spindle or shaft 1004 of the front wheels 906 is coupled to the front arms 1002 via connectors or bearings 1006. Similarly, to mount the rear wheels 908 to respective ones of the wheel frame support 910 of the first and second side frame assemblies 904a, 904b, the frame 102 includes rear arms 1008. To pivotally or rotatably couple the rear wheels 908 relative to the frame 902, a spindle or shaft 1010 of the rear wheels 908 is coupled to the rear arms 1008 via connectors or bearings 1012. Thus, the front and rear wheels 906 and 908 of the illustrated example rotate independently of each other about respective axes of rotation 1014a-d. Additionally or alternatively, to improve steering, the front and rear wheels 906, 908 rotate, swivel or pivot relative to the frame 902 about respective axes 934a, 934b (see FIG. 9) that are substantially perpendicular to the respective axes of rotation 1014a-d. The front and rear wheels 906, 908 of the illustrated example are implemented as swivel casters.

To mount the intermediate wheel 912 to the frame 902, the frame 902 employs a shaft or axle 1018 disposed between the first and second side frame assemblies 904a, 904b. The axle 1018 of the illustrated example is coupled to the first and second side frame assemblies 904a, 904b via connectors 1020 of the wheel frame support 910. The intermediate wheel 912 of the illustrated example is rotatably mounted about the axle 1018 to rotate about a horizontal axis of rotation 1022. In the illustrated example, the intermediate wheel 912 cannot pivot relative to the frame 902, but instead is mounted for back and forth movement.

Figure 11:
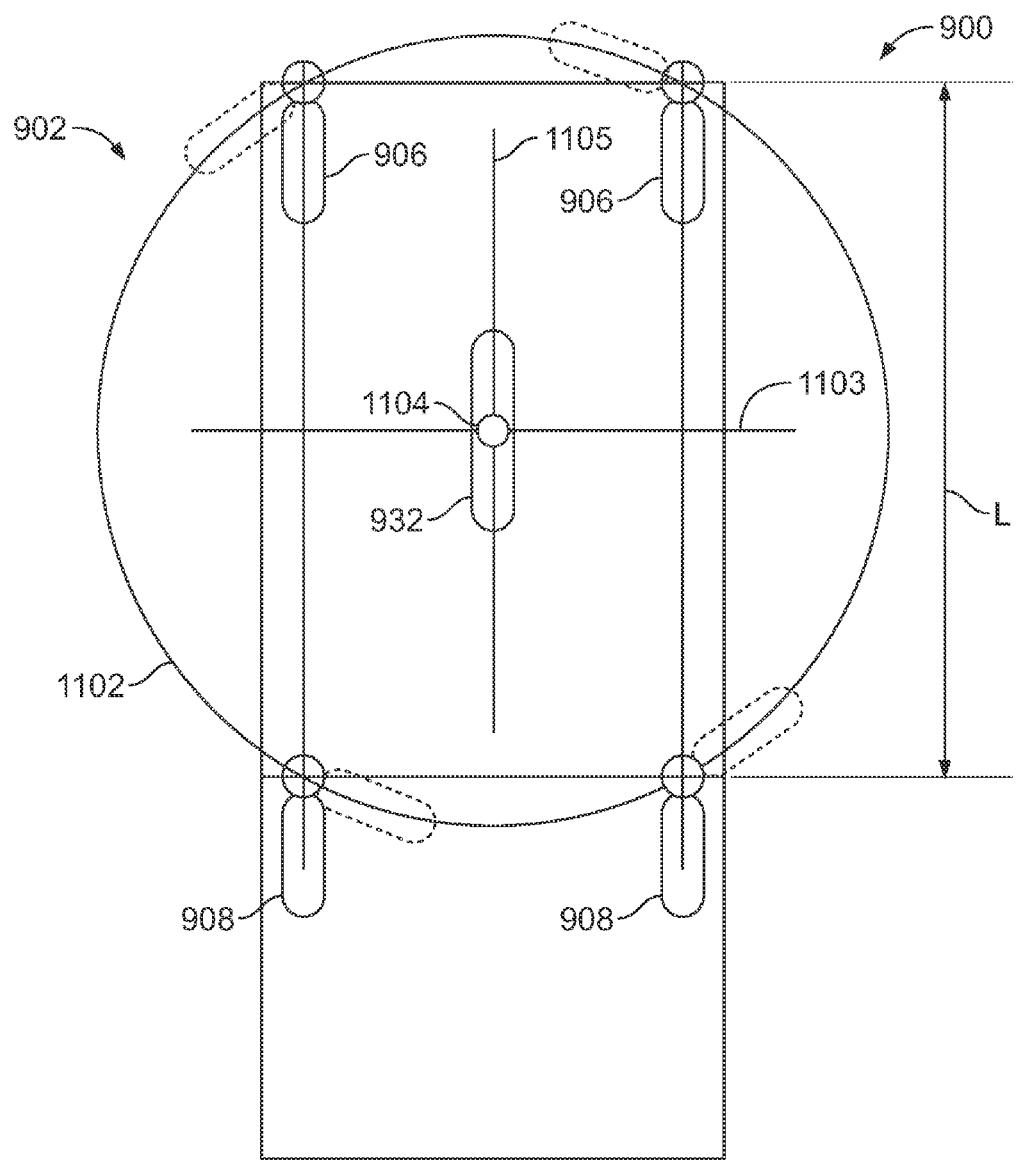
FIG. 11 is a schematic plan view of the example stroller of FIGS. 9 and 10 illustrating a turning radius of the example stroller of FIGS. 9 and 10

FIG. 11 is a schematic illustration of the example stroller 900 of FIGS. 9 and 10 illustrating a turning radius 1102 of the stroller 900. Referring to FIGS. 9-11, the intermediate wheel 912 is centrally located relative to the front and rear wheels 906, 908 on a central lateral axis 1103 bisecting the wheel base into substantially equal halves. Additionally or alternatively, the intermediate wheel 912 is centrally located relative to the first and second side frames 904a, 904b on a central longitudinal axis 1105 bisecting the wheel base into substantially equal left and right halves. Further, the intermediate wheel 912 of the illustrated example is centrically located between the first and second seats 913a, 913b (see FIG. 9).

To turn the stroller of the illustrated example, a user directs the handle 926 toward the right to turn the stroller to the left, or the user directs the handle 926 toward the left to turn the stroller to the right. Thus, when a user turns the stroller 900 of the illustrated example, the intermediate wheel 912 provides a pivot point 1104 about which the front wheels 906 and the rear wheels 908 can pivot or rotate. As illustrated by the example turning radius 1102 of FIG. 11, the stroller 900 of the illustrated example can turn 360 degrees in an arcuate or curved path within substantially length L of the wheel base when the front and rear wheels 906, 908 pivot or turn relative to the intermediate wheel 912. In addition, because the intermediate wheel 912 is disposed between the seats 913a, 913b, the center of mass of the stroller 900 substantially pivots about turning pivot or pivot point 1104, thereby reducing the torque or force needed to turn the stroller 900 of the illustrated example within the turning radius 1102. As a result, a user can turn the stroller 900 of the illustrated example along the turning radius 1102 with relative ease or relatively low resistance.

Figure 12:
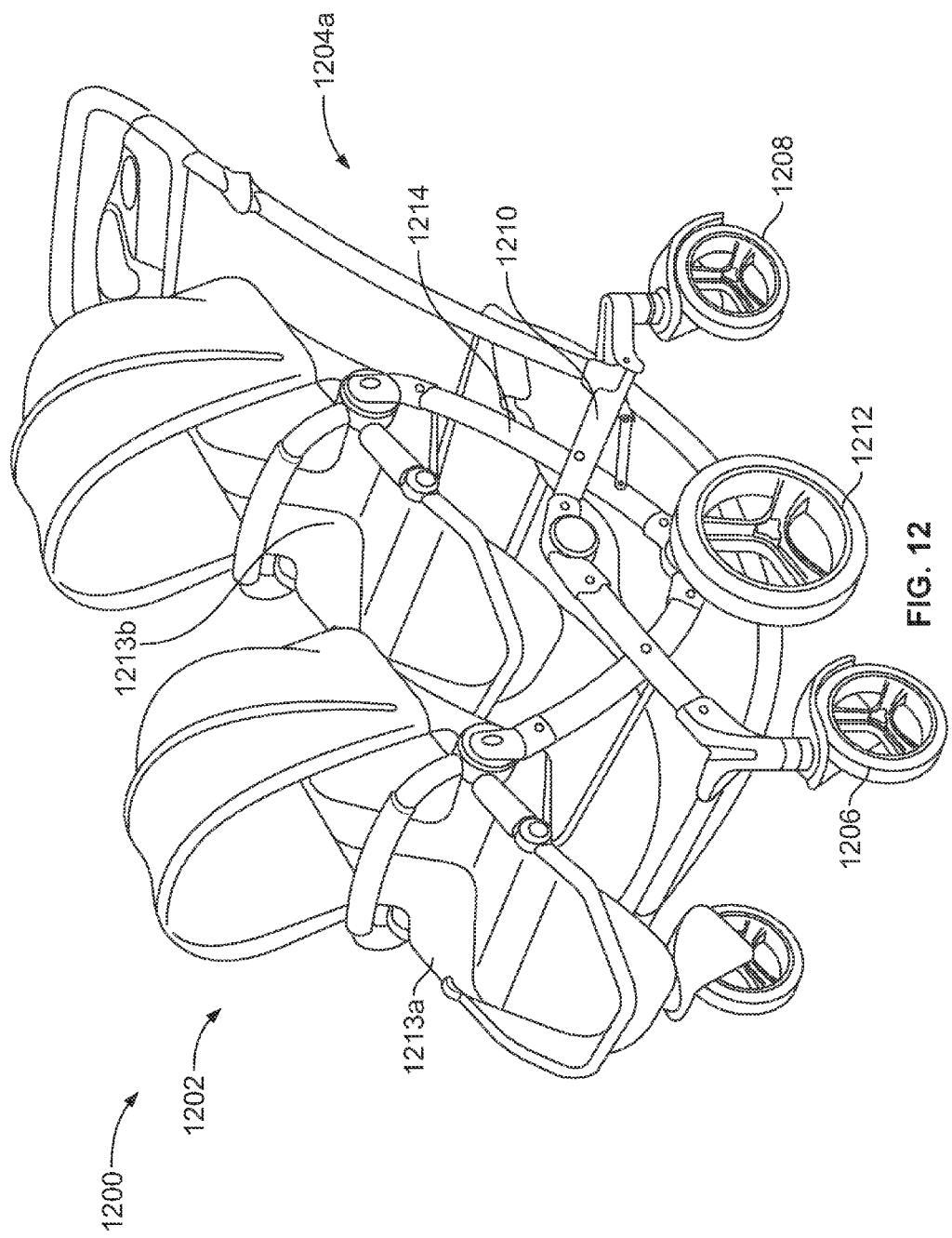
FIG. 12 is a left, perspective another example tandem stroller disclosed herein having two example intermediate wheels.
Figure 13:
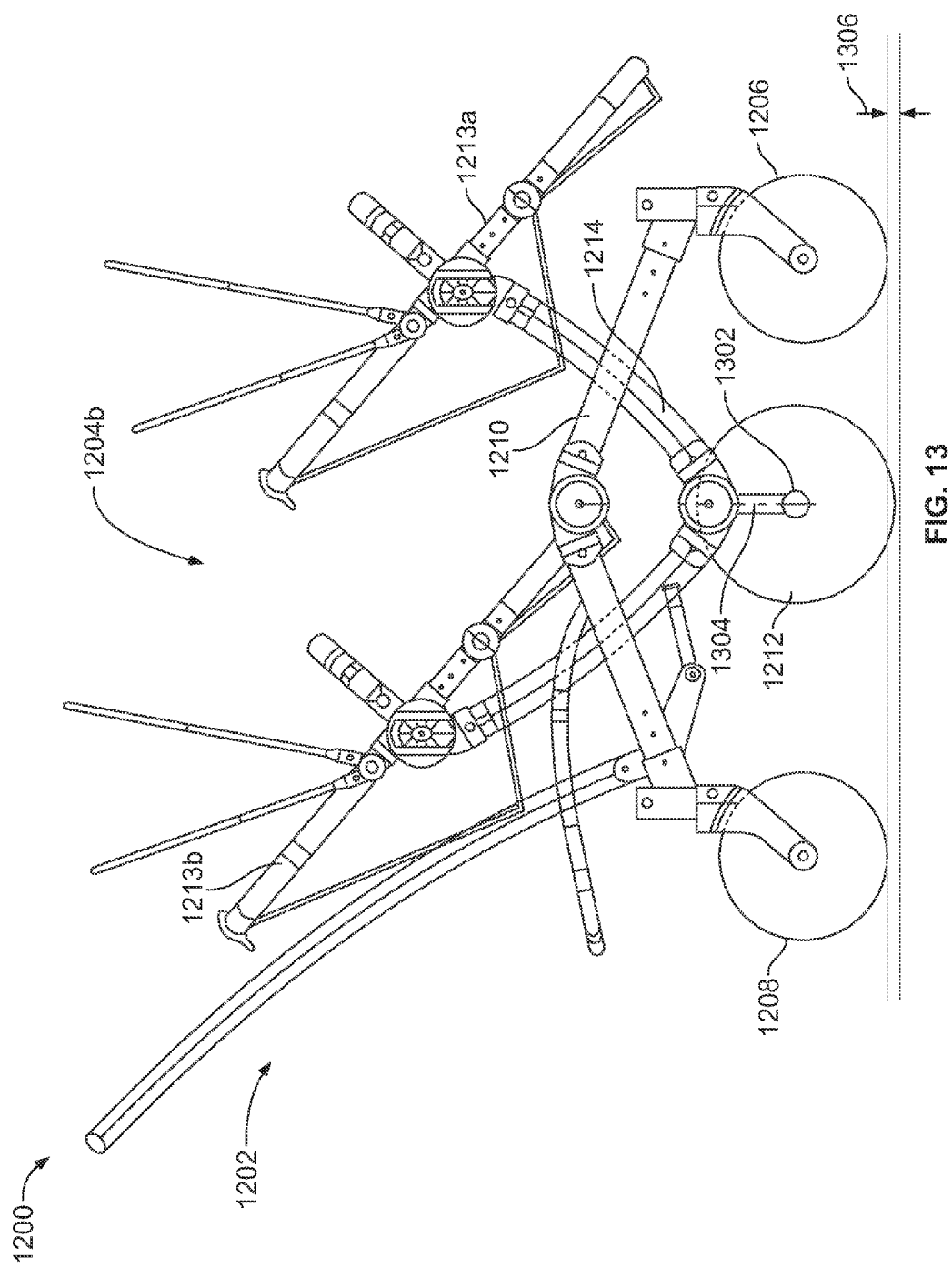
FIG. 13 is a right, side view of the example tandem stroller of FIG. 12.

FIG. 12 illustrates another example tandem stroller 1200 disclosed herein. FIG. 13 is a side view of the example stroller 1200 of FIG. 12. Those components of the example stroller 1200 that are substantially similar or identical to the components of the example stroller 900 described above and that have functions substantially similar or identical to the functions of those components will not be described in detail again below. Instead, the interested reader is referred to the above corresponding descriptions. To facilitate this process, similar reference numbers will be used for like structures. The stroller 1200 of the illustrated example includes a frame 1202 having a first side frame assembly 1204a and a second side frame assembly 1204b. To support one or more front wheels 1206 and one or more rear wheels 1208, the frame 1202 of the illustrated example employs a wheel frame support 1210. To support one or more seats 1213a, 1213b, each of the first and second side frame assemblies 1204a, 1204b includes a seat frame support 1214. The first and second side frame assemblies 1204a, 1204b of the illustrated example are substantially similar or identical and are symmetrical.

The stroller 1200 of the illustrated example includes intermediate wheels 1212 rotatably coupled to respective ones of the first and second side assemblies 1204a, 1204b. Thus, in contrast to the stroller 900 of FIGS. 9-11, the example stroller 1200 of the illustrated example includes two intermediate wheels 1212.

In the illustrated example, each of the intermediate wheels 1212 rotates independently of the other about a substantially horizontal axis of rotation. The intermediate wheels 1212 are not connected to each other via an axle (e.g., the axle 152 of FIGS. 1-4). To enable the intermediate wheels 1212 to rotate independently from each other, the seat frame supports 1214 of the respective first and second side frame assemblies 1204a, 1204b include axles or wheel mounts 1302 that depend from respective arms 1304 of the seat frame supports 1214. Additionally, each of the intermediate wheels 1212 of the illustrated example is prevented from swiveling or pivoting relative to the frame. The intermediate wheels 1212 of the illustrated example have diameters that are larger than the diameters of the front and rear wheels 1206, 1208. Referring to FIG. 13, the front and rear wheels 1206, 1206 are elevated or offset relative to the intermediate wheels 1212 by a distance 1306 (e.g., a quarter inch). Thus, the intermediate wheels 1212 provide a pivot point about which the front and rear wheels 1206, 1208 can rotate when a user turns the stroller 1200 of the illustrated example. As a result, a user can turn the stroller with relatively low resistance.

Figure 14:
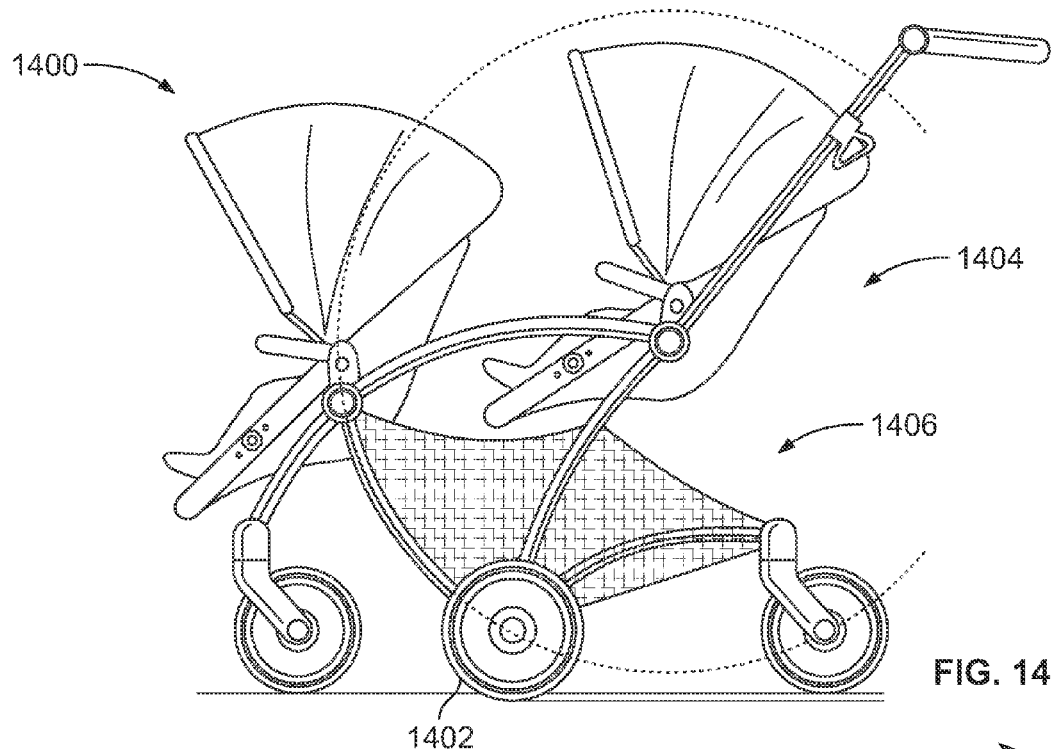
FIG. 14 is a side view of another example tandem stroller disclosed herein shown in a non-collapsed position.
Figure 15:
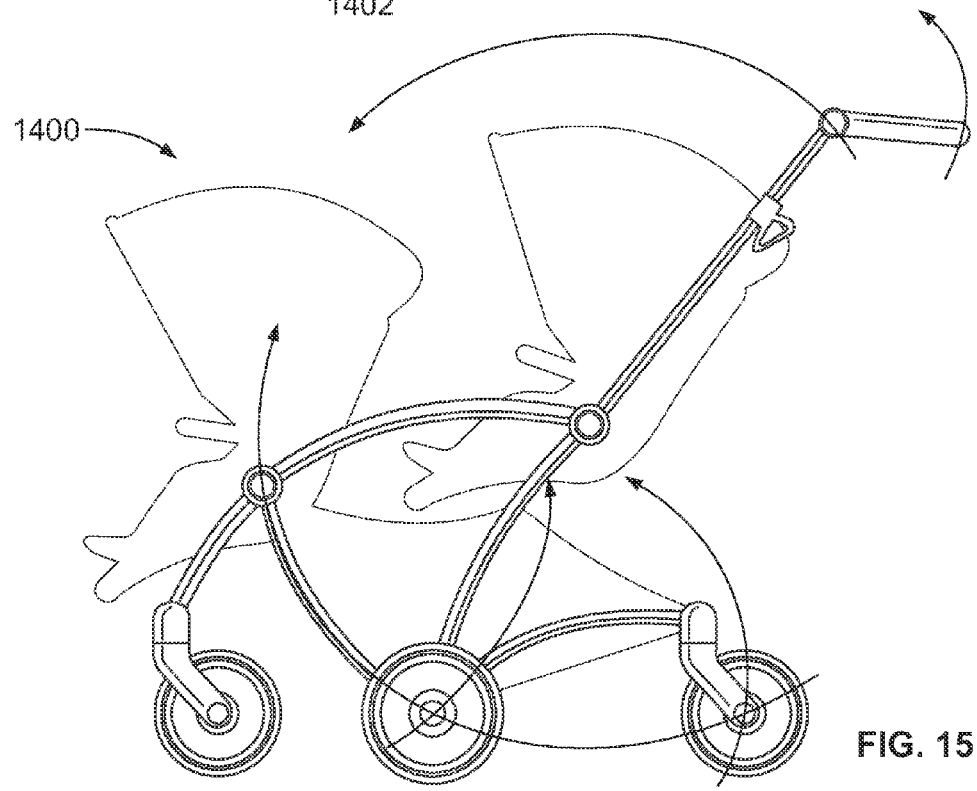
FIG. 15 is a side view of the example tandem stroller of FIG. 14, showing the stroller partially collapsed.
Figure 16:
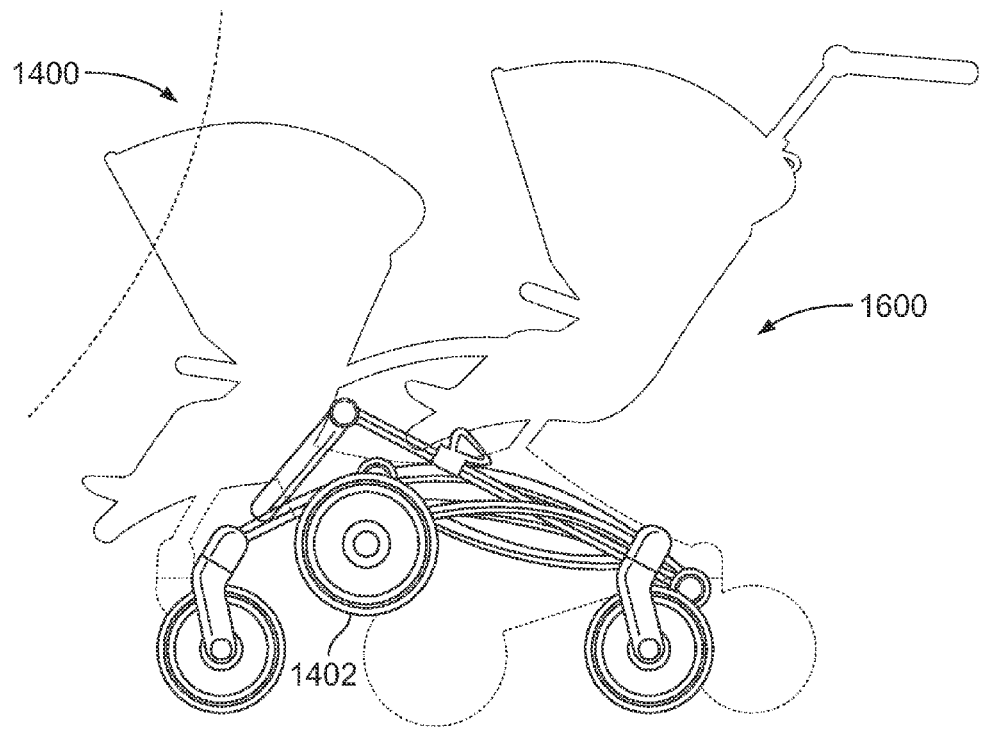
FIG. 16 is a side view of the example tandem stroller of FIGS. 14 and 15, showing the stroller fully collapsed.

FIG. 14-16 illustrate another example tandem stroller 1400 disclosed herein. The example stroller 1400 has intermediate wheels 1402. The example stroller 1200 is configurable between an in-use or unfolded position 1404 as shown in FIG. 14 and a fully collapsed, folded or storage position 1600 shown in FIG. 16. Although only one side frame assembly 1406 of the stroller 1400 is shown, the example stroller 1400 includes a second side frame assembly that is substantially similar or identical to the first side frame assembly 1406. Referring to FIG. 16, the intermediate wheel 1402 of the illustrated example does not significantly increase the overall envelope of the stroller 1400 when the stroller 1400 is in the in use position 1404 shown in FIG. 14 or the collapsed position 1600 shown in FIG. 16. As shown in FIG. 16, the stroller 1400 of the illustrated example has a low profile or compact folded position 1600.

Figure 17:
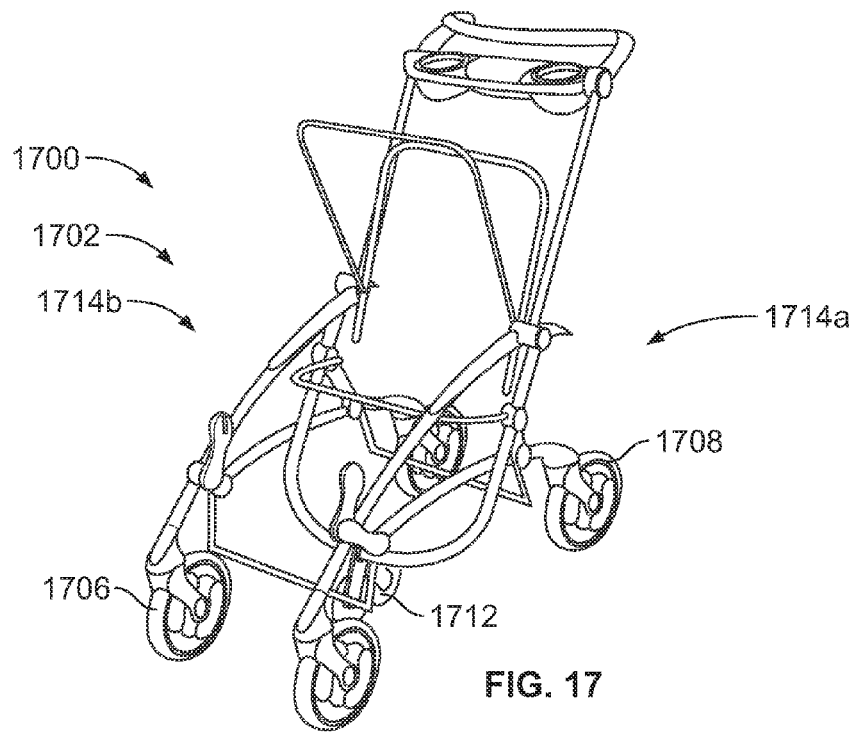
FIG. 17 is yet another example stroller disclosed herein having one example intermediate wheel.

FIG. 17 illustrates another example stroller 1700 disclosed herein. Those components of the example stroller 1700 that are substantially similar or identical to the components of the example stroller 800 described above and that have functions substantially similar or identical to the functions of those components will not be described in detail again below. Instead, the interested reader is referred to the above corresponding descriptions. For example, in the illustrated example of FIG. 17, the example stroller 1700 includes a frame 1702 having a first side frame assembly 1714a and a second side frame assembly 1714b laterally spaced from each other to accommodate an infant seat extending between the side frame assemblies 1714a, 1714b.

In the illustrated example, the intermediate wheel 1712 is a twin inline wheel. The twin inline wheel 1712 has a diameter that is smaller than the diameter of the front and rear wheels 1706, 1708. However in other examples, the twin inline wheel 1712 has a diameter that is greater than, or equal to, the diameters of the front and rear wheels. The twin inline wheel 1712 is fixed from swiveling or rotating relative to the frame 1702. Thus, the twin inline wheel 1712 tends to maintain or guide the stroller 1700 of the illustrated example within a substantially straight path when the stroller is pushed in a direction intended to be straight. Further, twin inline wheel 1712 provides a pivot point that is located between the front and rear wheels 1706, 1708 about which the front and rear wheels 1706, 1708 pivot when a user turns the stroller 1700 of the illustrated example. In this example, the intermediate wheel 1712 is disposed midway between the front and rear wheels 1706, 1708 and is disposed midway between the first and second side frame assemblies 1714a, 1714b.

Figure 18:
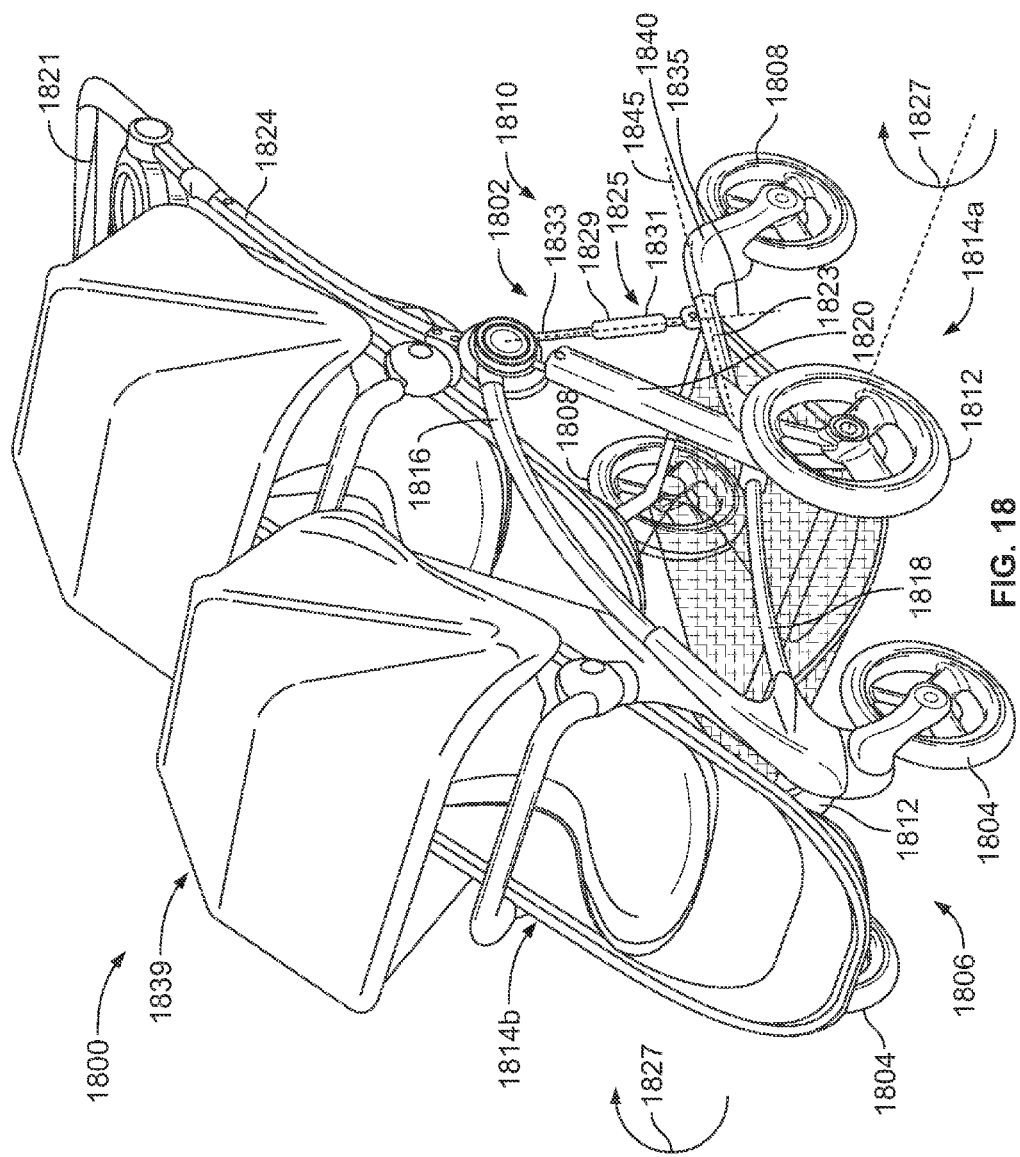
FIG. 18 is a perspective view of another example stroller disclosed herein.

FIG. 18 illustrates another example stroller 1800 disclosed herein. Those components of the example stroller 1800 that are substantially similar or identical to the components of the example stroller 100 described above and that have functions substantially similar or identical to the functions of those components will not be described in detail again below. Instead, the interested reader is referred to the above corresponding descriptions. To facilitate this process, similar reference numbers will be used for like structures. For example, in the illustrated example of FIG. 18, the example stroller 1800 includes a frame 1802 having one or more front wheels 1804 (e.g., swivel casters) to support a front end 1806 of the frame 1802 and one or more rear wheels 1808 (e.g., swivel casters) to support a rear end 1810 of the frame 1802.

Additionally, for the purpose of further improving tracking (e.g., reducing side-to-side sway or drift during forward movement), maneuverability, steering and/or control, the frame 1802 of the illustrated example employs intermediate wheels 1812 disposed between the front and rear wheels 1804, 1808. The intermediate wheels 1812 are disposed at approximately a midpoint between the front and rear wheels 1804, 1808. Alternatively, as described in greater detail below in connection with FIG. 19, the intermediate wheels 1812 may be positioned closer to the rear wheels 1808 than the front wheels 1804. Each intermediate wheel 1812 of the illustrated example defines a pivot point disposed between the front and rear wheels 1804, 1808. Consequently, both the front end 1806 of the stroller 1800 and the rear end 1810 of the stroller 1800 pivot or rotate in an arcuate path relative to the turning pivot provided by the intermediate wheels 1812 when a user turns the stroller 1800 of the illustrated example.

The frame 1802 of the illustrated example includes a first side frame assembly 1814a and a second side frame assembly 1814b laterally spaced from each other to accommodate an infant seating area 1839 extending between the side frame assemblies 814a, 814b. Each of the first and second side frame assemblies 1814a, 1814b of the illustrated example includes an upper frame support 1816, a lower frame support 1818, an intermediate frame support 1820, and a rear frame support member 1823. A handle frame support 1824 couples a handle 1821 to the frame 1802. The example handle 1821 enables a user to move, control, tilt and/or steer the stroller 1800 and is adjacent the rear wheels 1808.

To improve stability and/or facilitate balancing when maneuvering the stroller 1800 over a curb or other obstacle, the example stroller 1800 of the illustrated example employs a suspension apparatus 1825. More specifically, the suspension apparatus 1825 provides stability and/or facilitates balancing when the front end 1806 of the stroller 1800 is pivoted or tilted relative to the rear end 1810 of the frame 1802 about the intermediate wheels 1812 in a direction represented by arrow 1827 (e.g., an upward direction relative to a support surface (e.g., the ground)). For example, to pivot or lift the front wheels 1804 in the direction 1827, a downward force is applied to the handle 1821. This downward force has a component that is substantially perpendicular to a turning force applied to the handle 1821 to turn or steer the front wheels 1808 of the stroller 1800 in a direction substantially perpendicular to the direction 1827.

In the illustrated example, the suspension apparatus 1825 employs a damper or fluid cylinder 1829 (e.g., an air cylinder) coupled to the first frame assembly 1814a. More specifically, the fluid cylinder 1829 of the illustrated example is mounted between the rear frame support 1823 and the intermediate frame support 1820. As shown in FIG. 18, the fluid cylinder 1829 has a first end 1831 (e.g., a cylinder) mounted to the rear frame support 1823 and a second end 1833 (e.g., a piston)

mounted to the intermediate frame support 1820. In the illustrated example, each of the ends 1831, 1833 of the fluid cylinder 1829 may be pivotally mounted to the respective rear and/or intermediate frame supports 1823, 1820 via, for example, brackets. The end 1831 of the fluid cylinder 1829 of the illustrated example is mounted adjacent a rear wheel housing 1840 that couples the rear wheel 1808 to the frame 1802. Further, in the illustrated example, a longitudinal axis 1835 of the fluid cylinder 1829 is at a non-perpendicular angle relative to an axis 1845 of the rear frame support 1823. Additionally or alternatively, although not shown, the second side frame 1814b may also include a suspension apparatus 1825.

The suspension apparatus 1825 generally dampens or distributes a downward force applied to the handle 1821 between the frame assemblies 1814a, 1814b. Further, the suspension apparatus 1825 provides a reactive force or torque toward the front end 1806 of the frame 1802 when the front end 1806 is pivoted relative to the rear end 1810 about the intermediate wheels 1812. The suspension apparatus 1825 of the illustrated example dampens or supports a weight of the stroller 1800 that may otherwise shift toward the rear end 1810 of the frame 1802 (e.g., away from the intermediate wheels 1812) when the front end 1806 is pivoted in the direction 1827.

For example, the reactive force or torque provided by the suspension apparatus 1825 reduces (e.g., significantly reduces or prevents) a shift of the center of mass of the stroller 1800 (e.g., the weight of the stroller and/or a child in the seating area 1839) away from the intermediate wheels 1812 and toward the rear wheels 1808 when the front end of the frame 1806 is pivoted or tilted about the intermediate wheels 1812. In other words, the reactive force maintains the center of mass substantially aligned and/or adjacent the intermediate wheels 1812. As a result, the suspension apparatus 1812 facilitates balancing and/or improves stability of the stroller 1800 by causing the intermediate wheels 1812 and/or the rear wheels 1808 to remain engaged and/or in contact with the ground or a surface when the front end 1806 is tilted or lifted off of the ground relative to the rear end 1808. Absent the suspension apparatus 1825, a user would need to apply a greater force to balance the stroller 1800 and maintain the intermediate wheels 1812 and the rear wheels 1808 in contact with the ground when the front end 1806 of the stroller 1800 is lifted in the direction 1827 (e.g., an upward direction).

FIG. 19 illustrates another example stroller 1900 disclosed herein. Those components of the example stroller 1900 that are substantially similar or identical to the components of the example strollers 100 and 1800 described above and that have functions substantially similar or identical to the functions of those components will not be described in detail again below. Instead, the interested reader is referred to the above corresponding descriptions. To facilitate this process, similar reference numbers will be used for like structures. For example, in the illustrated example of FIG. 19, the example stroller 1900 includes a frame 1902 having one or more front wheels 1904 (e.g., swivel casters) to support a front end 1906 of the frame 1902 and one or more rear wheels 1908 (e.g., swivel casters) to support a rear end 1910 of the frame 1902. The frame 1902 of the illustrated example includes a first side frame assembly 1914a and a second side frame assembly 1914b (FIG. 20A) laterally spaced from each other to accommodate an infant seating area 1939 extending between the side frame assemblies 1914a, 1914b.

Additionally, for the purpose of further improving tracking, maneuverability, steering and/or control, the frame 1902 of the illustrated example employs intermediate wheels 1912 disposed between the front and rear wheels 1904, 1908. Each intermediate wheel 1912 of the illustrated example defines a pivot point disposed between the front and rear wheels 1904, 1908. Consequently, both the front end 1906 of the stroller 1900 and the rear end 1910 of the stroller 1900 are able to pivot or rotate in an arcuate path relative to a pivot point provided by the intermediate wheel 1912 when a user turns the stroller 100 of the illustrated example.

Turning in detail to FIG. 19, to improve tracking, steering and/or maneuverability, the diameter (e.g., an 8 inch diameter) of the intermediate wheel 1912 is greater than the diameter (e.g., a 6 inch diameter) of the front wheel 1904 and/or the diameter of the rear wheel 1908 (e.g., a 6 inch diameter). For the purpose of further improving tracking, maneuverability, steering and/or control, the intermediate wheel 1912 of the illustrated example is offset relative to a midpoint between the front wheel 1904 and the rear wheel 1908 (e.g., relative to a point equidistant between respective vertical axes 1944 and 1950 of rear and front housings 1940, 1946). In other words, the intermediate wheel 1912 is positioned closer to the rear wheel 1808 than to the front wheel 1804. More specifically, a distance D1 between a center or axis of rotation 1958 of the intermediate wheel 1912 and a center or axis of rotation 1942 of the rear wheel 1904 is less than a distance D2 between the center 1958 of the intermediate wheel 1912 and a center or axis of rotation 1948 of the front wheel 1904. For example, a ratio between the distance D1 and the distance D2 may be between zero and one.

The intermediate wheel 1912 of the illustrated example is positioned adjacent to, or substantially beneath (e.g., aligned with) a seating area 1939 (e.g., a rear infant seat) of the stroller 100. As a result, the intermediate wheel 1912 absorbs a substantial portion of a load provided by a child sitting in a seat 1939a of the stroller 1900 of the illustrated example. In this manner, the combined load or weight of the stroller 100 and a child in the seat 1939a requires less force (e.g., torque) to turn, pivot, steer, lift and/or push the stroller 1900 (e.g., via the handle 1921) then would be required by a stroller and a child of similar combined weight without the intermediate wheels 1912 because the center of mass of the stroller 1900 of illustrated example is closer to the pivot point defined by the intermediate wheel 1912 than it would be to a pivot point of a stroller without the intermediate wheel 1912.

Additionally or alternatively, positioning or offsetting the intermediate wheel 1912 closer to the rear wheel 1908 than the front wheel 1904 significantly facilitates pivoting or lifting of the front end 1906 of the frame 1902 relative to the rear end 1910 of the frame 1902 about the intermediate wheels 1912 (e.g., titling or pivoting the front end in an upward direction to maneuver the stroller 1900 over a curb). In addition, similar to the stroller 1800 of FIG. 18, the example stroller 1900 of the illustrated example employs a suspension apparatus 1925 to significantly improve stability and/or facilitate balancing when the front end 1906 of the frame 1902 is pivoted relative to the rear wheel 1908 about the intermediate wheel 1912. The example suspension apparatus 1925 is identical to the example suspension apparatus 1825 of FIG. 18.

Figure 20A:
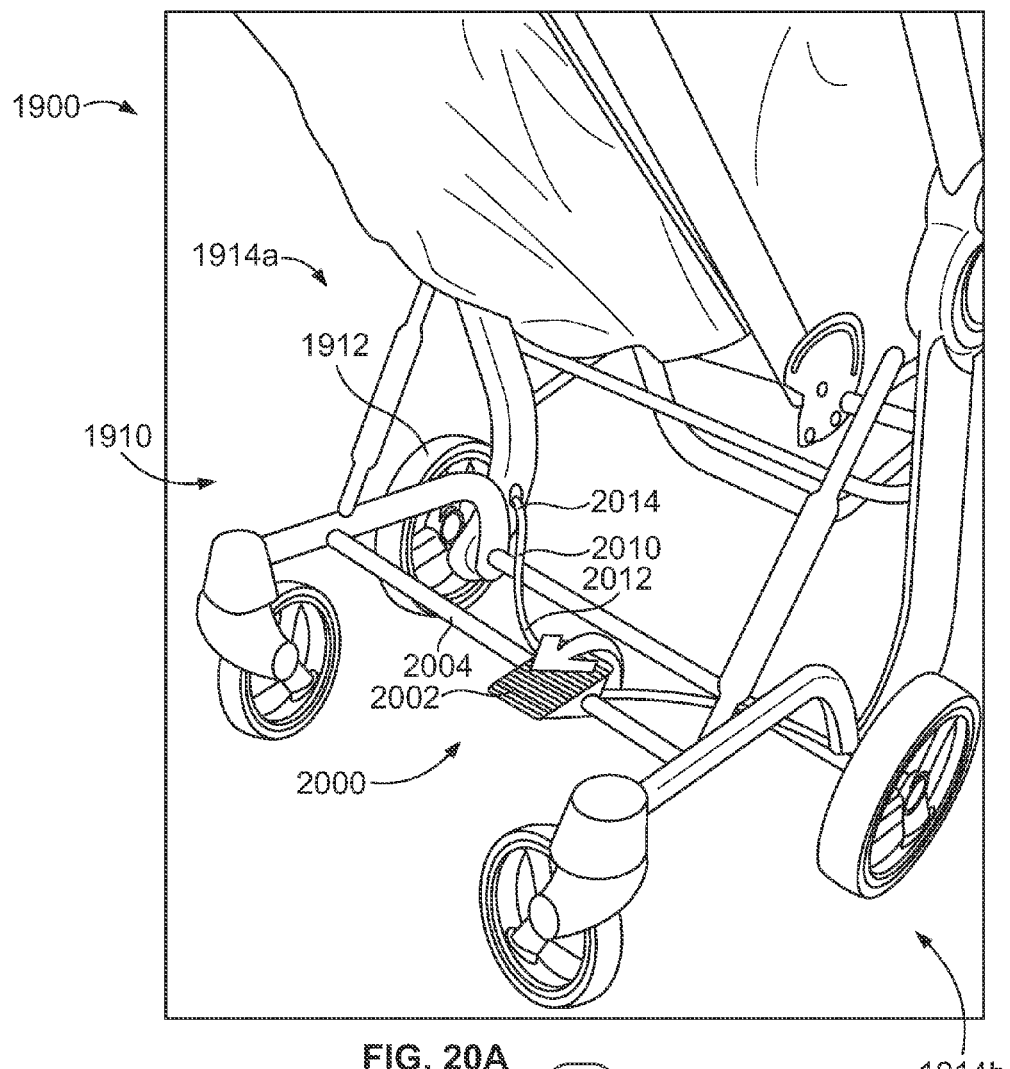
FIG. 20A is a partial rear view of the example stroller of FIG. 19 showing an example brake apparatus of the example stroller.
Figure 20B:
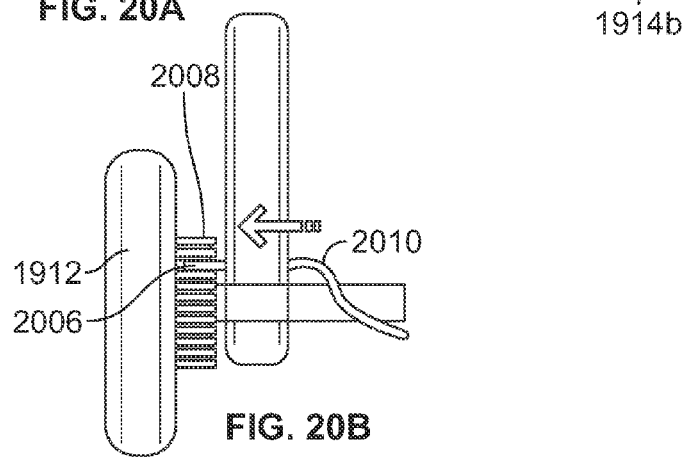
FIG. 20B is a partial enlarged view of an example wheel of the example stroller of FIGS. 19 and 20A.
Figure 21A:
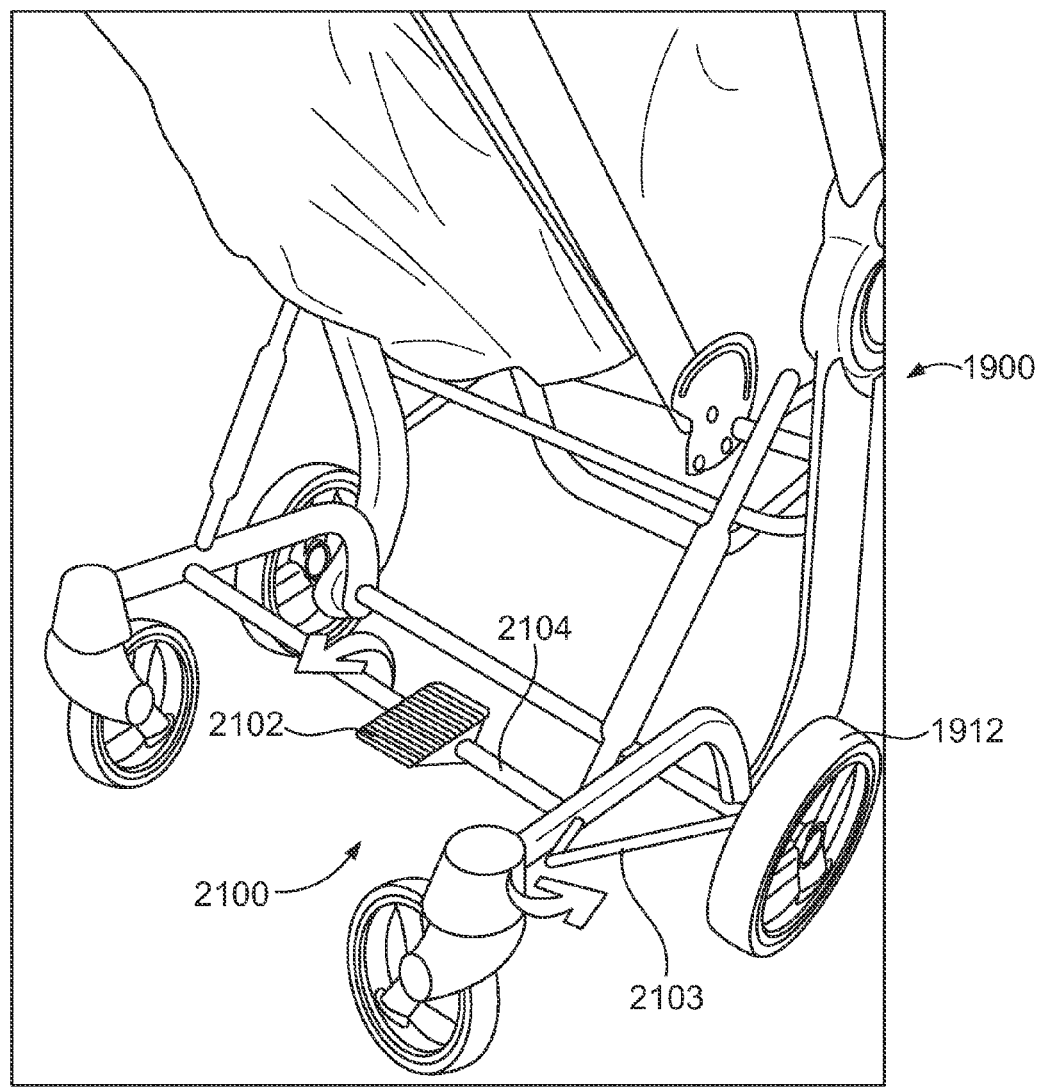
FIG. 21A is a partial rear view of the example stroller of FIG. 19 having another example brake apparatus disclosed herein.
Figure 21B:
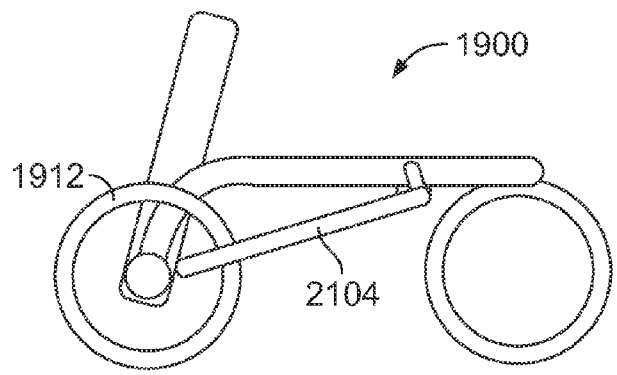
FIG. 21B is a partial enlarged side view of the example brake apparatus of FIG. 21A.

FIG. 20A is an enlarged rear view of the stroller 1900 of FIG. 19. FIG. 20B is a partial rear view of the example intermediate wheel 1912 of FIG. 20A. As shown in FIGS. 20A and 20B, the stroller 1900 employs a brake apparatus 2000. In particular, the brake apparatus 2000 is movable between a locked position and an unlocked position. To move the brake apparatus 2000 between the locked and unlocked positions, the stroller 1900 of the illustrated example employs a brake lever or foot pedal 2002. The brake lever 2002 is actuated or rotated relative to a cross-bar or frame support 2004 to activate a brake member or plunger 2006 (FIG. 21B)

relative to a locking interface 2008 (FIG. 21B). In this example, the locking interface 2008 is coupled with (e.g., integrally coupled or formed with a hub of) the intermediate wheel 1912. Thus, the brake apparatus 2000 prevents rotation of the intermediate wheel 1912 in the locked position and enables rotation of the intermediate wheel 1912 in the unlocked position. To move the plunger 2006 relative to the locking interface 2008 of the intermediate wheel 1912, the example brake apparatus 2000 of the illustrated example employs a cable 2010. In particular, a first end 2012 of the cable 2010 is coupled to the brake lever 2002 and a second end 2014 of the cable 2010 is coupled to the plunger 2006. Rotation of the brake lever 2002 relative to the cross-bar 2004 causes the cable 2010 to move the plunger 2006 into and out of engagement with the lock interface 2008. In the illustrated example, the lock interface 2008 employs a plurality of protrusions or teeth 2016.

FIGS. 21A and 21B illustrate another example brake apparatus 2100 that may be employed by the example stroller 1900 of the illustrated example. Turning in detail to FIG. 21, the brake apparatus 2100 includes a brake lever 2102 and a rod 2103 that moves a plunger relative to a locking interface of the intermediate wheel 1912 (e.g., the plunger 2006 and the locking interface 2008 of FIG. 20B). The brake lever 2102 pivots between a first or locked position and a second or unlocked position about a cross-bar 2104. In operation, the brake lever 2102 pivots a cam (not shown) that moves the rod 2103 and, thus, the plunger relative to the locking interface.

Figure 22:
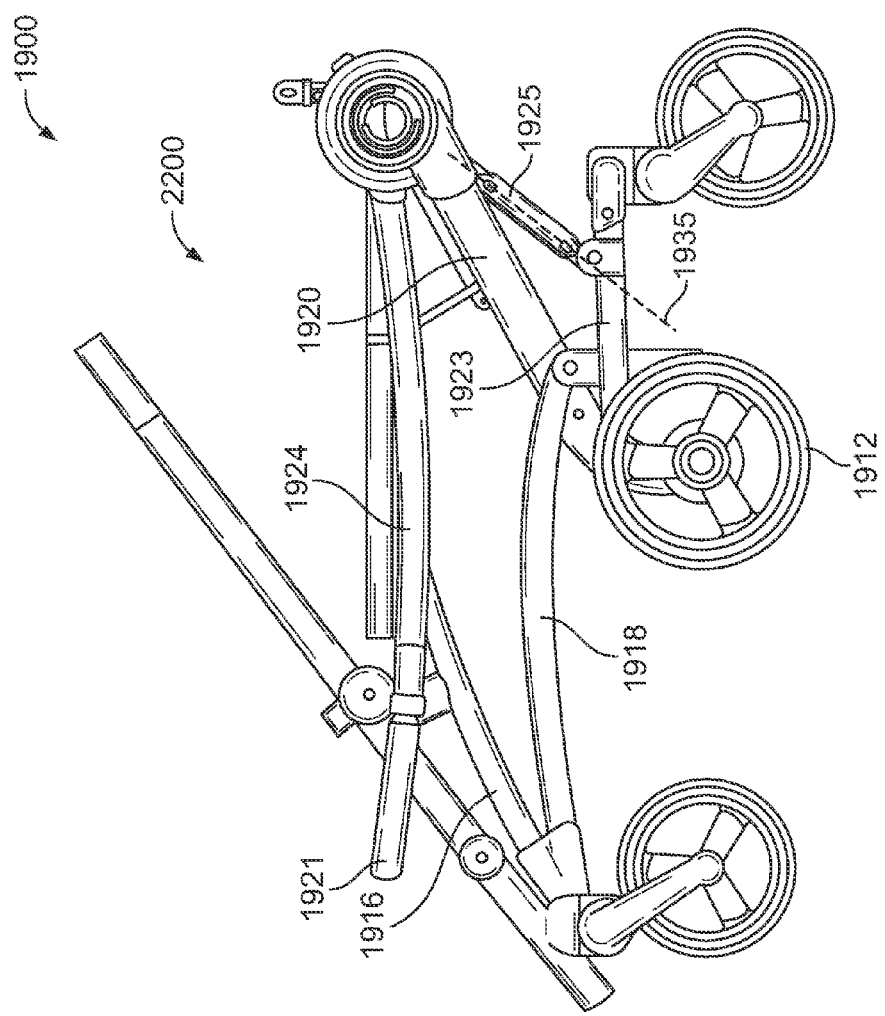
FIG. 22 is a side view of the example stroller of FIGS. 18 and 19 shown in a folded position.

FIG. 22 illustrates the example stroller 1900 of FIG. 19 in a fully folded position 2200. As shown in the illustrated example, the stroller 1900 is configurable between an in-use or unfolded position illustratively shown in FIG. 19 and a fully collapsed, folded or storage position 2200 shown in FIG. 22. Referring to FIG. 19, the intermediate wheel 1912 and/or the suspension apparatus 1925 of the illustrated example do not substantially increase (e.g., do not increase) the overall dimensional envelope (e.g., a length) of the stroller 1900 when the stroller 1900 is in the in use position shown in FIG. 19 or the collapsed position 2200 shown in FIG. 22. Additionally, the suspension apparatus 1925 does not interfere with the folding position 2200. In particular, the suspension apparatus 1925 may pivot relative the frame portions 1916, 1918, 1920, 1923 and/or 1924 when the frame 1902 is collapsed to the collapsed position 2200. As shown, the suspension apparatus 1925 pivots relative to the frame 1902. In particular, a longitudinal axis 1935 of the suspension apparatus 1925 is at a different non-perpendicular angle relative to rear frame support 1923 in the collapsed position 2200 than the angle of the longitudinal axis 1935 relative to the rear frame support 1923 in the use position of FIG. 19. As shown in FIG. 22, the stroller 1900 of the illustrated example has a low profile or compact folded position 2200.

Additionally or alternatively, the rear frame support 1923 may be removably coupled to the frame 1902 or the intermediate frame support 1920. For example, the rear frame support 1923 may be detached to facilitate moving the stroller to collapsed position 2200. Additionally or alternatively, the rear frame support 1923 may be removably coupled to the frame 1902 to provide a modular stroller that can be converted between a stroller employing intermediate wheels 1912 and a stroller without the intermediate wheels 1912.

Additionally or alternatively, although the example stroller 1900 of the illustrated example is a tandem stroller, an example stroller apparatus described herein may employ single seat stroller. In some examples, the intermediate wheels 1912 may be aligned with or positioned adjacent the center of the single seat.

Figure 23:
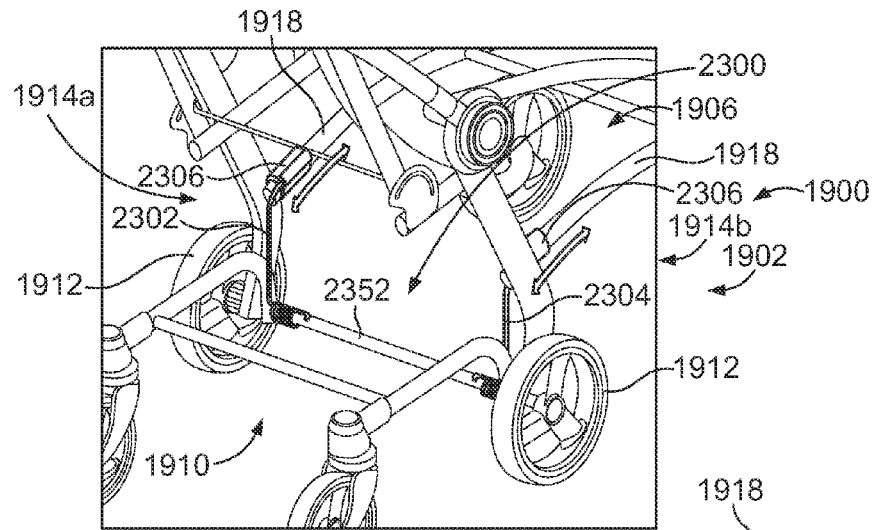
FIG. 23 is an enlarged view of the example stroller of FIG. 19 having another example suspension apparatus disclosed herein.
Figure 24:
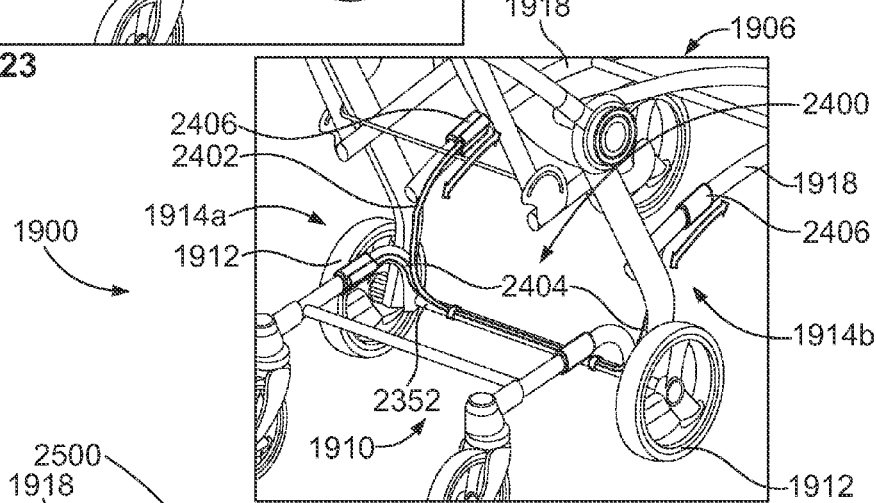
FIG. 24 is an enlarged view of another example stroller of FIG. 19 having another example suspension apparatus disclosed herein.
Figure 25:
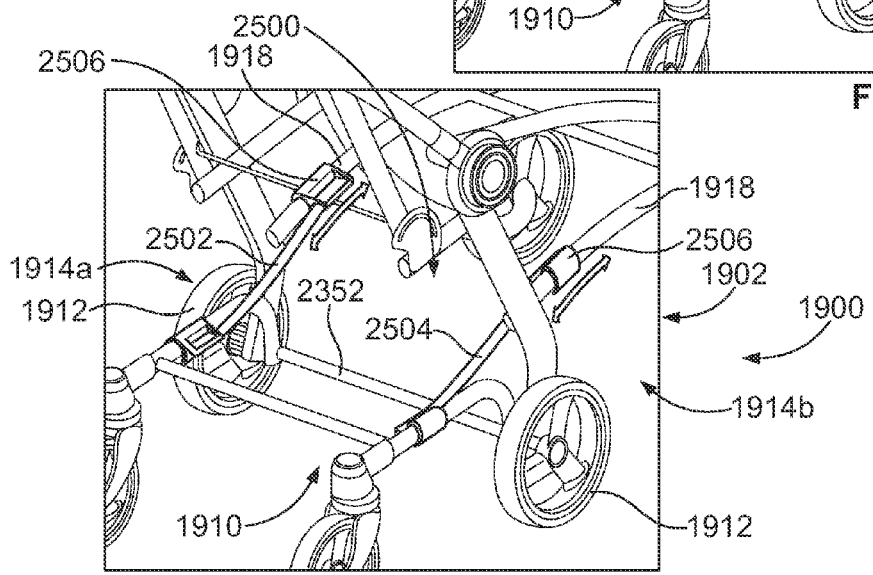
FIG. 25 is an enlarged view of another example stroller of FIG. 19 having another example suspension apparatus disclosed herein.

FIGS. 23, 24 and 25 illustrate the example stroller 1900 of FIG. 19 having other example suspension apparatus 2300, 2400 and 2500 disclosed herein. The suspension apparatus 2300-2500 of the illustrated example function substantially similarly to the suspension apparatus 1825 of FIG. 18 and will not be described in detail again below. Instead, the interested reader is referred to the above corresponding description.

Turning in detail to FIG. 23, the example suspension apparatus 2300 of the illustrated example includes a first torsion spring 2302 and a second torsion spring 2304. More specifically, the first torsion spring 2302 is coupled to the first frame assembly 1914a and the second torsion spring 2304 is coupled to the second frame assembly 1914b. Each of the torsion springs 2302, 2304 includes a first end slidably coupled to the lower frame support 1918 via a slider 2306 and a second end fixedly coupled to an axle 2352 supporting the intermediate wheels 1912. The sliders 2306 enable the torsion springs 2302, 2304 to pivot or twist about the axle 2352 when the front end 1906 of the stroller 1900 is pivoted or lifted relative to the rear end 1910 of the stroller 1900 about the intermediate wheels 1912. When the front end 1906 of the frame 1902 is pivoted upward about the intermediate wheels 1912, the torsion springs 2302, 2304 provide a reactive torque or force toward the front end 1906 of the frame 1902 to enhance stability. Additionally or alternatively, to enable the stroller 1900 to fold, the sliders 2302 enable the suspension apparatus 2300 to slide relative to the frame 1902 during folding.

Referring to FIG. 24, the example suspension apparatus 2400 of the illustrated example includes a first torsion bar 2402 and a second torsion bar 2404. More specifically, the first torsion bar 2402 is coupled to the first frame assembly 1914a and the second torsion bar 2404 is coupled to the second frame assembly 1914b. Each of the torsion bars 2402, 2404 includes a first end slidably coupled to the lower frame support 1918 via a slider 2406 and a second end fixedly coupled to the axle 2352 supporting the intermediate wheels 1912. The sliders 2406 enable the torsion bars 2402, 2404 to pivot or twist about the axle 2352 when the front end 1906 of the stroller 1900 is pivoted or lifted relative to the rear end 1910 of the stroller 1900 about the intermediate wheels 1912. When the front end 1906 of the frame 1902 is pivoted upward about the intermediate wheels 1912, the torsion bars 2402, 2404 provide a reactive torque or force toward the front end 1906 of the frame 1902 to enhance stability. Additionally or alternatively, to enable the stroller 1900 to fold, the sliders 2402 enable the suspension apparatus 2400 to slide relative to the frame 1902 during folding.

Referring to FIG. 25, the example suspension apparatus 2500 of the illustrated example includes a first leaf spring 2502 and a second leaf spring 2504. More specifically, the first leaf spring 2502 is coupled to the first frame assembly 1914a and the second leaf spring 2504 is coupled to the second frame assembly 1914b. Each of the leaf springs 2502, 2504 includes a first end slidably coupled to the lower frame support 1918 via a slider 2506 and a second end fixedly coupled to an axle 2352 supporting the intermediate wheels 1912. The sliders 2506 enable the leaf springs 2502, 2504 to pivot or twist about the axle 2352 when the front end 1906 of the stroller 1900 is pivoted or lifted relative the rear end 1910 of the stroller 1900 about the intermediate wheels 1912. When the front end 1904 of the frame 1902 is pivoted upward about the intermediate wheels 1912, the leaf springs 2502, 2504 provide a reactive torque or force toward the front end 1906 of the frame 1902 to enhance, maintain or provide stability to the stroller 1900 when the front end 1906 is lifted. Additionally or alternatively, to enable the stroller 1900 to fold, the sliders 2502 enable the suspension apparatus 2500 to slide relative to the frame 1902 during folding.

Figure 26:
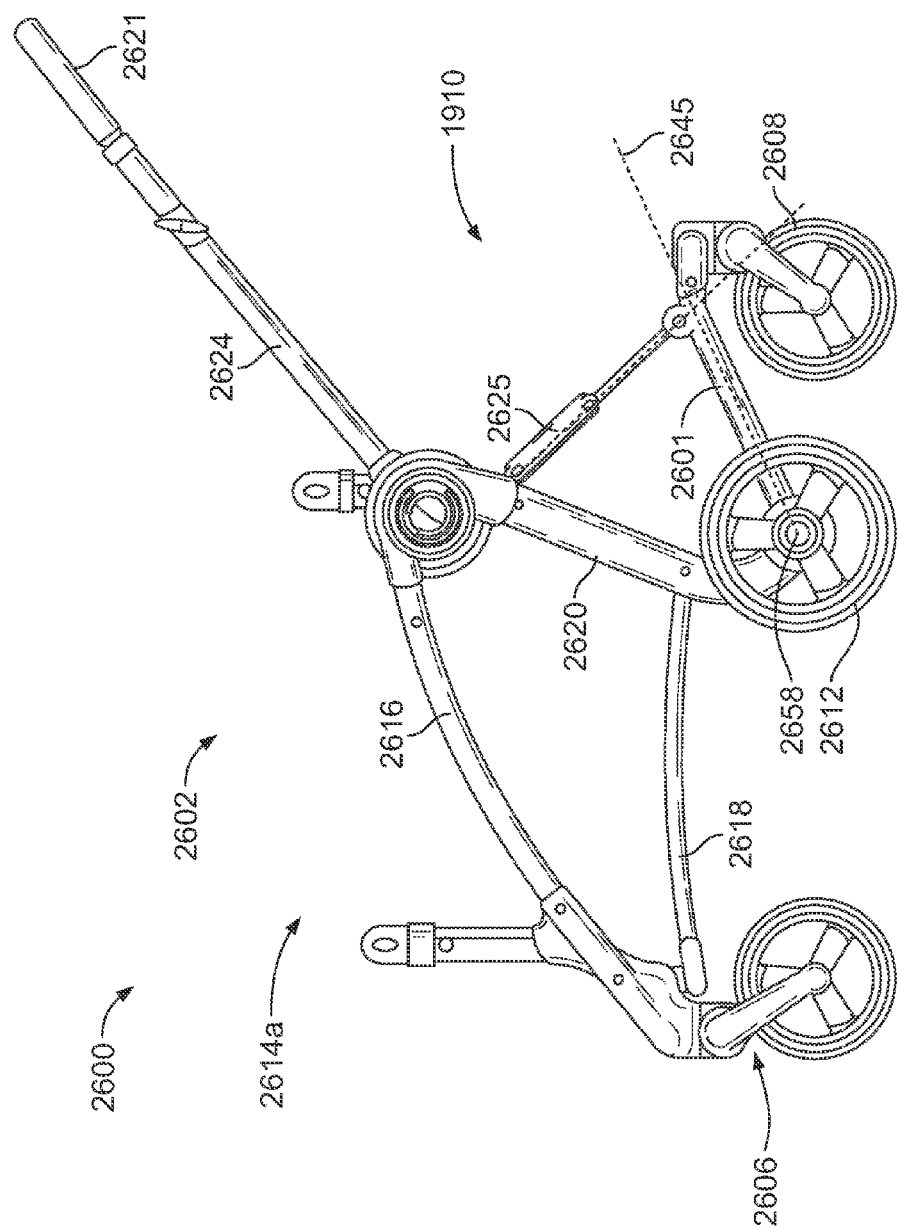
FIG. 26 is a side view of another example stroller disclosed herein.

FIG. 26 is a side view of another example stroller 2600 disclosed herein. Those components of the example stroller 2600 that are substantially similar or identical to the components of the example stroller 1800 described above and that have functions substantially similar or identical to the functions of those components will not be described in detail again below. Instead, the interested reader is referred to the above corresponding descriptions. To facilitate this process, similar reference numbers will be used for like structures. For example, the stroller 2600 of the illustrated example includes a frame 2602 having a first frame assembly 2614a that is substantially similar or identical to a second side frame assembly. For example, the side frame assembly 2614a includes an upper frame support 2616, a lower frame support 2618, an intermediate frame support 2620, a handle frame support 2624 and a handle 2621.

However, unlike the stroller 1800 of FIGS. 18A and 18B, the example stroller 2600 of the illustrated example employs a rear frame support 2601 coupled to the frame 2602 at an angle relative to the intermediate frame support 2620. For example, an axis 2645 of the rear frame support 2601 is at a non-perpendicular angle relative to the intermediate frame support 2620 and/or an axis of rotation 2658 of the intermediate wheel 2612. In this manner, the rear frame support 2601 provides further stability and/or balance to the stroller 2600 when the front end 2606 is tilted or lifted relative to a support surface (e.g., ground) and the rear end 2610 of the frame 2602. Further, the rear frame support 2601 enables an intermediate wheel 2612 to be positioned closer to a rear wheel 2608 to provide a more compact, shorter overall dimensional envelope (e.g., a length) of the stroller 2600 compared to, for example, the stroller 1900 of FIG. 19. Additionally, to further improve stability and/or balance, the stroller 2600 of the illustrated example employs a suspension apparatus 2625. The frame 2602 can support one or more seats. In other words, the stroller 2600 may be configured to provide a single seat stroller or a tandem seat stroller.

Figure 27:
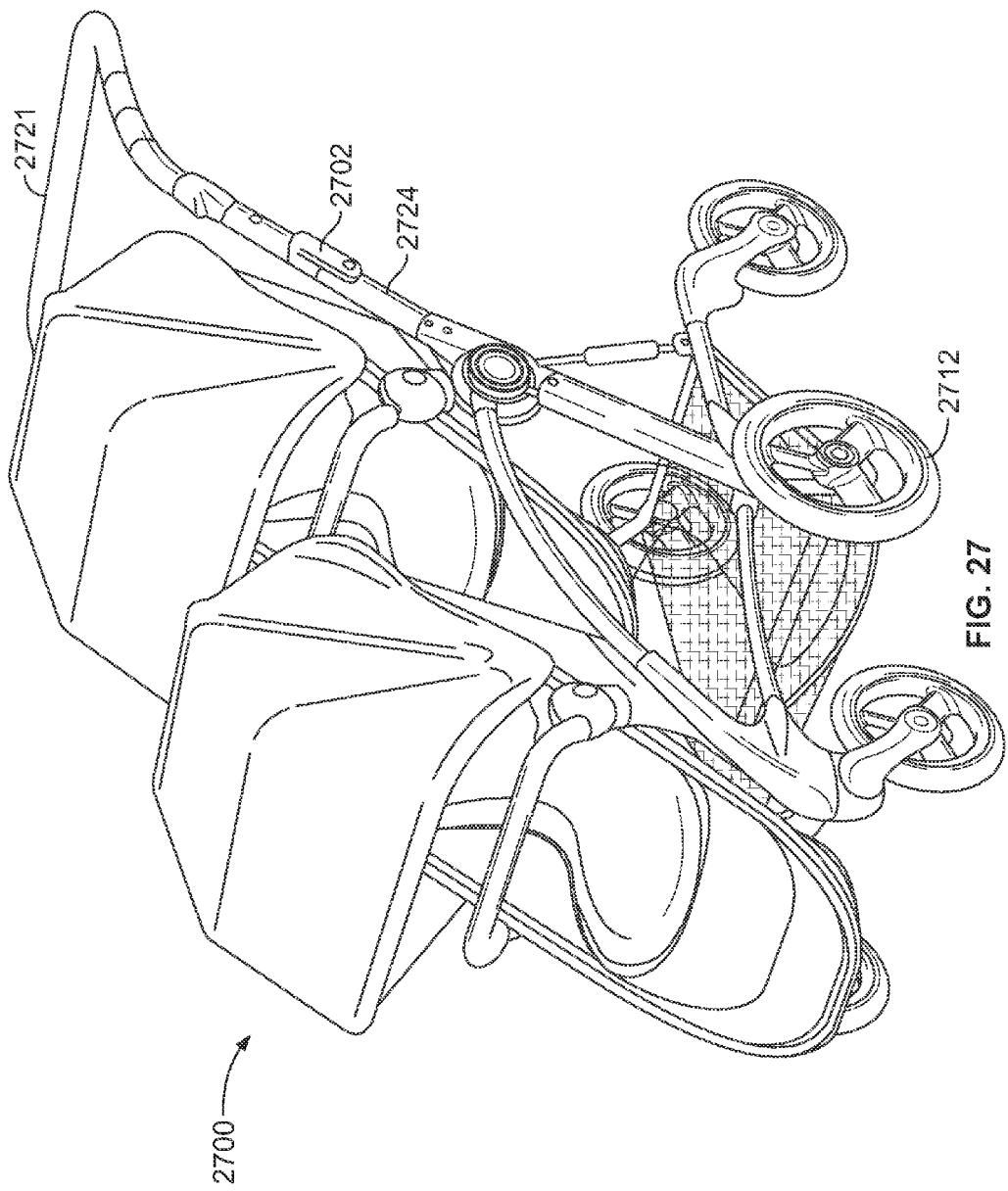
FIG. 27 is a perspective view of another example stroller disclosed herein

FIG. 27 illustrates yet another example stroller 2700 described herein. Those components of the example stroller 2700 that are substantially similar or identical to the components of the example stroller 1800 described above and that have functions substantially similar or identical to the functions of those components will not be described in detail again below. Instead, the interested reader is referred to the above corresponding descriptions. To facilitate this process, similar reference numbers will be used for like structures. Unlike the stroller 1800 of FIGS. 18A and 18B, the example stroller 2700 of FIG. 27 employs a brake apparatus 2700 having a brake lever or actuator 2702 mounted to a handle 2721. In this manner, the brake apparatus 2700 enables a user to operate the brake apparatus 2700 via the handle 2721. A cable (not shown) operatively couples the brake lever 2702 to a plunger that interacts with a locking interface of an intermediate wheel 2712. Additionally or alternatively, the handle 2721 telescopically adjustable relative to a handle frame support 2724.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed:

1. A stroller comprising:
 a frame having an upper frame member, an intermediate frame member, a rear frame member, and a lower frame member, the lower frame member positioned between the upper frame member and the intermediate frame member;
 a seat;
 a front wheel coupled to the frame via the upper frame member;
 a rear wheel coupled to the frame via the rear frame member;
 an intermediate wheel coupled to the frame via the intermediate frame member, the intermediate frame member comprising a slot, the slot to receive a pin of the lower frame member to enable the intermediate frame member to pivot relative to the lower frame member during folding of the frame; and
 a suspension at a rear end of the frame to provide a reactive force when the front wheel is pivoted about the intermediate wheel, wherein the suspension comprises a fluid cylinder disposed adjacent the rear wheel between the rear frame member and the intermediate frame member.

2. A stroller comprising:
 a frame having an upper frame portion, an intermediate frame portion, and a rear frame portion;
 a seat;
 a front wheel coupled to the frame via the upper frame portion;
 an intermediate wheel coupled to the frame via the intermediate frame portion;
 a rear wheel coupled to the frame via the rear frame portion, the rear frame portion having a first end to receive the rear wheel and a second end; and
 a first connector having a first end and second end, the first end pivotally coupled to the intermediate frame portion and the second end pivotally coupled to the second end of the rear frame portion, the first end of the first connector to define a first pivot point relative to the intermediate frame portion and the second end of the first connector to define a second pivot point relative to the rear frame portion, the first connector to pivot about the first pivot point and the second pivot point during folding of the frame to enable the intermediate frame portion to move to a folded position relative to the rear frame portion to collapse the frame, and wherein the second end of the rear frame portion is pivotally coupled to the frame at the second pivot point to enable the intermediate frame portion and the upper frame portion to pivot relative to the rear frame portion about an axis of rotation of the intermediate wheel when the front wheel is elevated relative to the intermediate wheel and the rear wheel when the stroller is in a non-collapsed position.

3. A stroller as defined in claim 2, wherein a distance between a center of the intermediate wheel and a center of the rear wheel is less than a distance between the center of the intermediate wheel and a center of the front wheel.

4. The stroller of claim 2, wherein the intermediate wheel is elevated with respect to the front wheel and the rear wheel when the frame is in a collapsed position.

5. The stroller of claim 2, wherein the first end of the first connector is to move toward the rear frame portion during folding of the frame.

6. The stroller of claim 2, wherein the first end of the first connector is to move distal to the rear frame portion when the frame is moved from a collapsed position to the non-collapsed position.

7. The stroller of claim 2, further comprising a second connector, the second connector to receive a first end of the upper frame portion and a first end of the intermediate frame portion.

8. The stroller of claim 7, wherein the front wheel is to support a second end of the upper frame portion and the intermediate wheel is to support a second end of the intermediate frame portion.

9. A stroller comprising:
a frame having an upper frame portion, an intermediate frame portion, a lower frame portion, and a rear frame portion;
a seat;
a front wheel coupled to the frame via the upper frame portion;
an intermediate wheel coupled to the frame via the intermediate frame portion;
a rear wheel coupled to the frame via the rear frame portion; and
a first connector having a first end and second end, the first end pivotally coupled to the intermediate frame portion and the second end pivotally coupled to the rear frame portion, the first end to define a first pivot point relative to the intermediate frame portion and the second end to define a second pivot point relative to the rear frame portion, the first connector to pivot about the first pivot point and the second pivot point during folding of the frame to enable the intermediate frame portion to move to a folded position relative to the rear frame portion to collapse the frame,
wherein the lower frame portion is coupled to the second end of the first connector and to the upper frame portion via a second connector, the second connector having a first end and a second end, the first end of the second connector being pivotally coupled to the upper frame portion to define a third pivot point and the second end of the second connector being pivotally coupled to the lower frame portion to define a fourth pivot point, the second connector to pivot about the third pivot point and the fourth pivot point during folding of the frame.

10. A frame for use with a stroller, the frame comprising:
a first frame side and a second frame side and a seat positioned between the first frame side and the second frame side, each of the first frame side and the second frame side having:
a connector having a locked position and a released position;
an upper frame support having a first end and a second end, the first end of the upper frame support to be received by a first receiving port of the connector and the second end of the upper frame to couple a front wheel to the frame;
an intermediate frame support having a first end and a second end, the first end of the intermediate frame support to be received by a second receiving port of the connector and the second end of the intermediate frame support to couple an intermediate wheel to the frame, the connector to enable the upper frame support to pivot relative to the intermediate frame support when the connector is in the released position; and
a rear frame support having a first end and a second end, the first end of the rear frame support to couple a rear wheel to the frame and the second end of the rear frame support being pivotally coupled to the frame to (1) enable the intermediate frame support to pivot relative to the rear frame support when the frame moves between a collapsed position and an expanded position, and (2) enable the intermediate frame support and the upper frame support to pivot relative to the rear frame support about an axis of rotation of the intermediate wheel when the front wheel is elevated relative to the rear wheel.

11. The stroller of claim 10, wherein the seat is a tandem seat.

12. The stroller of claim 10, wherein a longitudinal axis of the rear frame support forms a non-perpendicular angle relative to an axis of rotation of the intermediate wheel when the rear frame support is coupled to the frame.

13. The stroller of claim 10, wherein a longitudinal axis of the rear frame support forms a perpendicular angle relative to an axis of rotation of the intermediate wheel when the rear frame support is coupled to the frame.

14. A frame for use with a stroller, the frame comprising:
a first frame side and a second frame side and a seat positioned between the first frame side and the second frame side, each of the first frame side and the second frame side having:
a connector having a locked position and a released position;
an upper frame support having a first end and a second end, the first end of the upper frame support to be received by a first receiving port of the connector and the second end of the upper frame to couple a front wheel to the frame;
an intermediate frame support having a first end and a second end, the first end of the intermediate frame support to be received by a second receiving port of the connector and the second end of the intermediate frame support to couple an intermediate wheel to the frame, the connector to enable the upper frame support to pivot relative to the intermediate frame support when the connector is in the released position;
a rear frame support having a first end and a second end, the first end of the rear frame support to couple a rear wheel to the frame and the second end of the rear frame support being pivotally coupled to the frame to enable the intermediate frame support to pivot relative to the rear frame support when the frame moves between a collapsed position and an expanded position; and
a handle pivotably coupled to the connector via a third receiving port of the connector, wherein in the released position, the connector is to enable the handle to rotate toward the upper frame support during folding of the frame and in the locked position, the connector is to enable the handle to rotate toward the rear frame support when the frame is expanded for use.

15. The stroller of claim 14, wherein the connector is to move toward the rear wheel when the connector is in the released position during folding of the frame.

* * * * *